(12) United States Patent
Morikawa et al.

(10) Patent No.: US 7,116,273 B2
(45) Date of Patent: Oct. 3, 2006

(54) MICROWAVE ANTENNA AND PROCESS FOR PRODUCING THE SAME

(75) Inventors: Takashi Morikawa, Kanagawa (JP); Hiroyuki Watanabe, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 206 days.

(21) Appl. No.: 10/931,237

(22) Filed: Sep. 1, 2004

(65) Prior Publication Data
US 2005/0179594 A1 Aug. 18, 2005

(30) Foreign Application Priority Data
Feb. 16, 2004 (JP) .................... P2004-038734

(51) Int. Cl.
*H01Q 1/38* (2006.01)
*D01F 9/12* (2006.01)
(52) U.S. Cl. .................... 343/700 MS; 423/447.3
(58) Field of Classification Search ........ 343/700 MS, 343/702, 846; 423/447.3
See application file for complete search history.

(56) References Cited
U.S. PATENT DOCUMENTS
6,333,016 B1 * 12/2001 Resasco et al. .......... 423/447.3
6,724,064 B1 * 4/2004 Watanabe et al. .......... 257/459
6,808,746 B1 * 10/2004 Dai et al. ................ 427/249.1

FOREIGN PATENT DOCUMENTS
JP        A 2002-7992      1/2002
JP        A 2002-503204    1/2002
JP        A 2003-510871    3/2003
WO       WO 97 06578       2/1997
WO       WO 99 25044       5/1999
WO       WO 02 01668 A2    1/2002

OTHER PUBLICATIONS
*Nikkei Science*, p. 10 {Sep. 1999}.
Lyubchenko et al., "Atomic Force Microscopy of DNA and Bacteriophage in Air, Water and Propanol: The Role of Adhesion Forces," *Nucleic Acids Research*, vol. 21, No. 5, pp. 1117-1123 {Jan. 29, 1993}.

* cited by examiner

*Primary Examiner*—Shih-Chao Chen
(74) *Attorney, Agent, or Firm*—Oliff & Berridge, PLC

(57) ABSTRACT

The microwave antenna includes a substrate, an antenna element supported on a surface of the substrate, and a power feeding electrode connected to the antenna element. The antenna element includes a carbon nanotube structure constituting a network structure having plural carbon nanotubes electrically connected to each other. The process for producing the microwave antenna includes applying plural carbon nanotubes each having a functional group to a surface of the substrate and crosslinking the functional groups with a chemical bond to form a crosslinked part, so as to form the carbon nanotube structure.

52 Claims, 10 Drawing Sheets

REACTION SCHEME OF INTRODUCTION OF
CARBOXYL GROUP INTO CARBON NANOTUBE

REACTION SCHEME OF ESTERIFICATION OF
CARBON NANOTUBE CARBOXYLIC ACID

REACTION SCHEME OF POLYMERIZATION REACTION OF CARBON NANOTUBE CARBOXYLIC ACID METHYL ESTER WITH GLYCERIN BY ESTER EXCHANGE

MICROWAVE ANTENNA AND PROCESS FOR PRODUCING THE SAME

BACKGROUND OF THE INVENTION

1. Field of the Invention

The present invention relates to a microwave antenna using carbon nanotubes as a material for an antenna element, and a process for producing the same. More specifically, the invention relates to a microwave antenna capable of being utilized for high capacity wireless communication, such as UWB (ultra wide band), and a process for producing the same.

2. Description of the Related Art

In the field of communication antennas, various studies have been made with respect to the design of antennas to have a high efficiency, a wide bandwidth and a small size, associated with the enlargement of usable range of radio wave. Among the studies, Douglas Werner, et al. of Pennsylvania University, have theoretically noted that the efficiency is improved by disposing antennas in a fractal form, and the number of antennas can be reduced to ¼. Nathan Cohen of Boston University has noted that the use of the Sierpinski's triangle forms capacitance and inductance owing to the zigzag configuration thereof, so as to enable a wide bandwidth and to reduce the area to ⅙. Both the studies can be referred in Nikkei Science, September 1999, page 10.

A specific form and structure of the fractal antenna is disclosed in WO 97/06578, WO 99/25044 and WO 02/01668A2. Specifically, in WO 02/01668A2, a wide bandwidth of from 1 $GH_z$ to 9.5 $GH_z$ as an area of equal to or lower than −10 dB under an evaluation of reflection coefficient is concretely disclosed.

However, there is a limitation in reduction in size even in a fractal antenna since it contains a polygon corresponding to a particular wavelength and the limited repetition of similar figures thereof. Due to the limitation in size, a strict fractal form are not achieved, thus there is a deviation from the ideal state in the low frequency range. In order to solve the problem, a multilevel antenna having plural polygons combined with each other has been proposed (as shown in JP-T-2003-510871), but it is still insufficient to cope with further demands including small size and wide bandwidth.

A carbon nanotube (CNT) has been considered to be applied various applications owing to the peculiar shape and characteristics thereof. A carbon nanotube has a tubular shape with one-dimensional nature formed by winding a graphene sheet constituted by six-membered rings of carbon atoms. A carbon nanotube having a structure containing one graphene sheet is referred to as a single wall nanotube (SWNT), and a carbon nanotube having a multi-layer structure is referred to as a multi-wall nanotube (MWNT). An SWNT has a diameter of about 1 nm, and an MWNT has a diameter of several tens of nanometer, which are extremely thinner than conventional products that are referred to as carbon fibers.

A carbon nanotube has such a characteristic feature that it has a length in micrometer order and a significantly large aspect ratio of the length with respect to the diameter. Furthermore, a carbon nanotube is a substance that has such an extremely rare characteristic nature that it has both properties of metal and semiconductor owing to the spiral structure of the arrangement of six-membered rings of carbon atoms. Moreover, a carbon nanotube has an extremely high electroconductivity and can flow an electric current of 100 $MA/cm^2$ or more in terms of an electric current density.

A carbon nanotube also has excellent features in mechanical properties in addition to the electric characteristics. That is, it is constituted only carbon atoms, and therefore, it has a Young's modulus exceeding 1 TPa and is considerably tough in spite of the significant light weight thereof. Furthermore, it is a cage material and is rich in elasticity and restoration property. Thus, a carbon nanotube is extremely attractive as an industrial material owing to such various excellent properties.

Such a method for utilizing the excellent characteristics of a carbon nanotube has been developed that carbon nanotubes are formed into a film and applied to wiring and patterning. For example, pattern formation of carbon nanotubes has been made by utilizing the screen printing process and the photolithography technique. These techniques are excellent from the standpoint that a large area can be patterned at a time and are used for patterning an electron source of a field emission display (FED). In these techniques, however, carbon nanotubes are simply dispersed in a solvent and then coated, or coated after mixing with a binder, and therefore, they are insufficient in performance, such as mechanical strength and electroconductivity. Accordingly, they are difficult to be applied to an electrode and an electric circuit.

An example of applying the techniques to an antenna is disclosed in JP-A-2002-7992. However, the antenna having the constitution disclosed in the document is an antenna in coiled form since it is a simple electromagnetic induction type, but the bandwidth thereof is about from −20% to +20% of the designed frequency, and it has not been considered in bandwidth characteristics in the microwave region.

JP-T-2002-503204 discloses that carbon nanotube having a three-dimensional structure can be formed by using functionalized carbon nanotubes. JP-T-2002-503204 discloses such a material to be used simply as a flow cell electrode for chromatography that carbon nanotubes having functional groups bonded thereto for separation and adsorption of substances to be passed thereto are accumulated on a metallic mesh to form a porous material, and such a material that is formed by bonding carbon nanotubes by using an alkoxide of aluminum or silica (the alkoxide itself is an insulating material) as a crosslinking agent. However, JP-T-2002-503204 fails to refer to an application to an antenna.

SUMMARY OF THE INVENTION

The present invention has been made in view of the above circumstances. A purpose of the invention is to provide a microwave antenna that is capable of meeting the demands including small size and wide bandwidth by utilizing effectively the characteristics of carbon nanotubes, and a process for producing the same.

A first aspect of the invention provides a microwave antenna including a substrate, an antenna element supported on a surface of the substrate and a power feeding electrode connected to the antenna element. The antenna element includes a carbon nanotube structure constituting a network structure having a plurality of carbon nanotubes electrically connected to each other.

In the microwave antenna, the antenna element contains a carbon nanotube structure constituting a network structure having plural carbon nanotubes electrically connected to each other. Accordingly, the antenna element has electric pathways having various polygonal shapes and various sizes formed therein derived from the network structure formed with fine carbon nanotubes, and the electric pathways have various capacitances and inductances, so as to provide spontaneously such an antenna that has a complex of antenna elements having electric pathway lengths corresponding to various frequencies. Therefore, the microwave antenna according to the invention containing the antenna element has an extremely high efficiency or wide bandwidth owing to the antenna element.

According to a second aspect of the invention, it is provided a process for producing a microwave antenna including a substrate, an antenna element which is supported on a surface of the substrate and includes a carbon nanotube structure constituting a network structure having a plurality of carbon nanotubes electrically connected to each other and a power feeding electrode connected to the antenna element. The process includes applying a plurality of carbon nanotubes each having a functional group to a surface of the substrate; and crosslinking the functional groups with a chemical bond to form a crosslinked part, so as to form the carbon nanotube structure.

Conventionally, a structure intending to mutual interaction among carbon nanotubes by gathering carbon nanotubes to bring in contact with each other cannot be patterned unless it is sealed with a resin or the like, since the aggregate of carbon nanotubes is scattered (see JP-A-2002-7992). Upon sealing with a resin, carbon nanotubes flow before patterning by applying the resin, and the connections among the carbon nanotubes are lost in the case where the resin flows within the contacted parts, whereby the structure cannot be utilized as an antenna element of an antenna. Furthermore, in the case where carbon nanotubes are dispersed in a resin solution to form a dispersion liquid, which is then coated, connection through contact among carbon nanotubes cannot be attained unless the concentration of the carbon nanotubes is significantly increased, so as to cause a problem before patterning.

In the microwave antenna obtained by the process, the carbon nanotube structure constituting the antenna element has crosslinked parts formed by chemical bond among the plural functional groups, whereby such defects are prevented from occurring that the electric resistance is increased by flowing a resin to electric connection parts, and the electric resistance is fluctuated due to positional fluctuation of the carbon nanotubes. Accordingly, a microwave antenna with high performance and uniformity can be easily produced. Furthermore, the crosslinked structure can be stably produced since the crosslinked parts are formed through chemical bond.

DETAILED DESCRIPTION OF THE PREFERRED EMBODIMENTS

Figure 1:
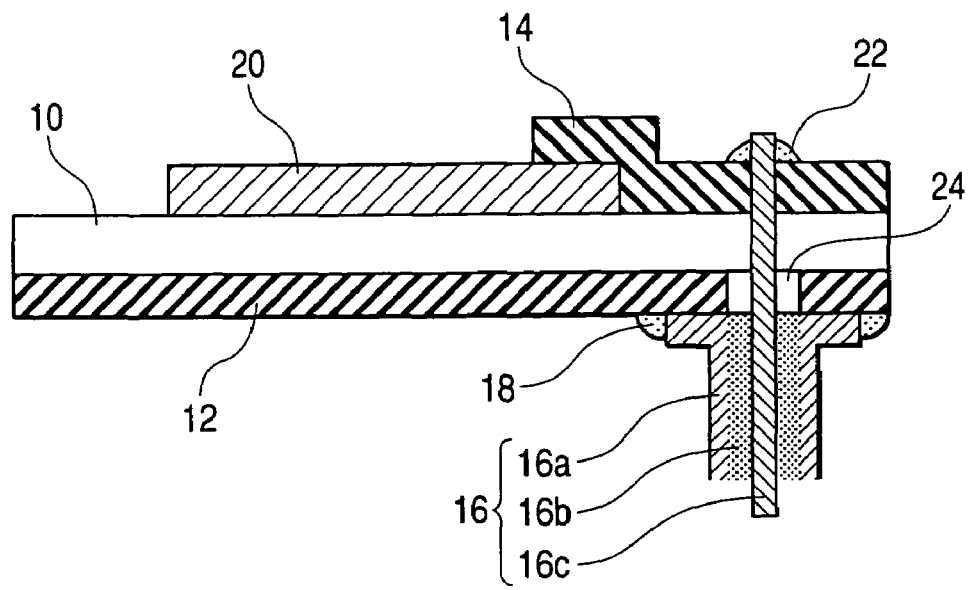
FIG. 1 is a schematic cross sectional view showing a microwave antenna according to a preferred example of the invention.

The details of the invention will be described below.

The invention provides a microwave antenna including a substrate, an antenna element supported on a surface of the substrate, and a power feeding electrode connected to the antenna element. The antenna element includes a carbon nanotube structure constituting a network structure having a plurality of carbon nanotubes electrically connected to each other. The antenna can be used for transmitting and/or receiving microwave. The antenna element works as a radiation device for transmission and a receiving device for reception.

The application frequency of the microwave antenna according to the invention is microwave. This is because the electric pathways that are formed in the antenna element have high sensitivity to microwave having a short wavelength. In particular, an antenna having high sensitivity to microwave of an extremely high frequency has been difficult to be produced, but such an antenna can be easily produced at low cost according to the invention.

The "microwave" generally includes decimetric wave of from 300 MHz to 3 GHz (UHF), centimetric wave of from 3 to 30 GHz (SHF), millimetric wave of from 30 to 300 GHz (EHF) and submillimetric wave of 300 GHz or higher. The microwave as the target of the invention includes all the aforementioned bands, and specifically it refers to a frequency of 300 MHz or higher. A frequency band where the microwave antenna according to the invention exhibits high sensitivity varies depending on the constitution thereof. The invention can provide a microwave antenna having sufficiently high sensitivity in a range of from 300 MHz to 300 GHz, and further high sensitivity can be obtained in a range of from 800 MHz to 60 GHz.

In the microwave antenna according to the invention, a shape of the substrate may be a plate form (a flat plate form) or a three-dimensional form. The plate form is preferred from the standpoint of reduction in size and handleability of the microwave antenna thus completed. Furthermore, such a constitution is preferred because the electric pathway length distribution is diversified that the whole area of at least the surface of the substrate, on which the antenna element is supported (supporting surface), is electrically insulative, and the power feeding electrode is connected to a part of the carbon nanotube structure as the antenna element, in comparison to the case where the whole of the carbon nanotube structure is supported by an electroconductive surface.

Except the aforementioned power feeding electrode that is separately provided, the power feeding electrode may also be formed as such a structure that a partial area of the supporting surface of the substrate is made electroconductive, to which the carbon nanotube structure is electrically connected, and the electroconductive area is used as the power feeding electrode. Furthermore, such a structure may be employed that the whole supporting surface of the substrate is made electrically insulative, and the power feeding electrode is provided from the upper side on the antenna element formed with the carbon nanotube structure arranged. In this case, it is preferred since the antenna element formed with the carbon nanotube structure and the power feeding electrode can be electrically connected certainly.

It is preferred that the microwave antenna further has an earth electrode. The earth electrode may be provided on a surface of the substrate different from the surface on which the antenna element is supported. In the case where the substrate is in a plate form in this constitution, the radiation direction of electromagnetic wave can be restricted to the side of the surface supporting the carbon nanotube structure by providing the earth electrode on the surface of the substrate opposite to the supporting surface. In this case, it is preferred to use a material having a high dielectric constant and a low dielectric loss as a material of the substrate since the microwave antenna can be miniaturized.

The earth electrode may also be provided on the surface of the substrate, on which the antenna element is supported, in an area different from an area in which the antenna element is supported. According to the constitution, the antenna element can be easily integrated with an amplification circuit and the like, and the radiation direction of electromagnetic wave can be widened to the side opposite to the surface supporting the antenna element.

The earth electrode may also be provided inside the substrate. In the case where the substrate is in a plate form in this constitution, the earth electrode may be accumulated inside the substrate. In the case where the substrate is in a three-dimensional form, such as a cylinder, a polygonal cone and a sphere, the provision of the electroconductive earth electrode inside the substrate enables effective radiation of electromagnetic wave in circumferential direction.

The antenna element in the microwave antenna according to the invention does not necessitate patterning for making an antenna element length corresponding to the wavelength of the radiation wave (i.e., an equal multiple, an integer multiple and an integer fraction) An antenna containing such antenna elements that microscopically have various shapes and various sizes, although it is macroscopically uniform, can be obtained only by forming the carbon nanotube structure uniformly, for example, in a film form, without patterning, whereby the antenna can be easily miniaturized. That is, electric pathways (i.e., microscopic antenna element) having various length and various sizes are formed inside the carbon nanotube structure, as having been described, and as a result, an antenna element having various electric pathways corresponding to wavelengths of radiation waves of a wide bandwidth is formed, whereby an antenna having wide bandwidth and reduction in size of the antenna it self can be realized.

In order that an antenna having a desired frequency band is certainly formed in the uniform film, it is preferred that electric pathways corresponding to the longest radiation wavelength within the frequency band to be used are formed inside the structure. Therefore, it is preferred that the carbon nanotube structure constituting the antenna element is (macroscopically) uniform (i.e., having no patterning but being solid) within at least an area having a diameter equal to the longest radiation wavelength. (Hereinafter, the expression "uniform" means "macroscopically uniform".) According to the constitution, an antenna element capable of being applied to a wide bandwidth can be certainly obtained even though electric pathways are not formed by patterning or the like corresponding to the radiation wavelength of the band to be used.

More specifically, under consideration of applications to portable phones and wireless LAN, a carbon nanotube structure that is uniform within at least an area of from 1.2 to 9 $cm^3$ is preferred since the communication band thereof is from 1.0 to 2.5 GHz. Upon considering applications to an antenna for the ETC (electronic toll collection) system using a higher frequency communication band (from 5.8 to 10GHz), a carbon nanotube structure that is uniform within at least an area of from 0.10 to 0.50 $cm^3$ is preferred.

It is preferred that the microwave antenna further contains a second conductor electrically connected to the carbon nanotube structure as the antenna element, in addition to the power feeding electrode. The second conductor electrically connected to the carbon nanotube structure functions as an additional antenna element, whereby the carbon nanotube structure functions as, in addition to the antenna element by itself, an impedance controller for the additional antenna element constituted by the second conductor. Accordingly, an electromagnetic wave having a desired frequency can be effectively radiated.

As the power feeding electrode, the earth electrode and the second conductor of the invention, arbitrary materials may be used including a metallic electrode, a dielectric material or semiconductor, a part or the whole of which is doped with an impurity ion to make electroconductive, and an organic electroconductive material. It is preferred that they are ohmically connected to the antenna element constituted by the carbon nanotube structure. Therefore, materials excellent in electroconductivity are preferred. Among these, a metallic electrode is most suitable. Specific examples of a material for the metallic electrode include aluminum, gold, silver, copper, platinum, an aluminum alloy, titanium and chromium. Aluminum, gold, copper and titanium are particularly preferred from the standpoint of connectivity to the carbon nanotubes.

The carbon nanotube structure in the microwave antenna of the invention constitutes a network structure having plural carbon nanotubes electrically connected to each other. Examples of the network structure include a so-called carbon nanotube dispersion film having a network structure containing plural carbon nanotubes intertwisted with each other to be electrically connected to each other, and a crosslinked film having a network structure formed with crosslinked positions by chemical bonds among plural carbon nanotubes.

The former carbon nanotube dispersion film includes a type having a resin filled in pores among the carbon nanotubes and a type having no resin filled therein. Both types thereof can constitute the carbon nanotube structure of the microwave antenna of the invention. In the carbon nanotube dispersion film, it is necessary that carbon nanotubes are packed in a high concentration to ensure interconnection. However, independent carbon nanotubes are aggregated with each other to form bundles, whereby a fine network structure is difficult to be formed. Furthermore, because the electric connection depends on physical contact, high resistance is achieved upon lightly contacted, and sometimes substantially insulated states are formed. Therefore, microscopic antenna elements (electric pathways) having various lengths and various shapes are difficult to be formed inside the structure. Moreover, the state of contact and arrangement of the carbon nanotubes becomes unstable, whereby there are some cases where the radiation efficiency cannot be sufficiently improved by increase and fluctuation of electric resistance, and the radiation efficiency is fluctuated.

Under the circumstances, the carbon nanotube structure is preferably the later crosslinked film containing plural carbon nanotubes and crosslinked parts each formed with a chemical bond of plural functional groups, and the chemical bond at least connects one end of one of the carbon nanotubes to another one of the carbon nanotubes. Owing to the network structure formed with crosslinked parts by chemical bond, bonded parts by chemical bond are certainly formed in addition to electric connections by physical contact, so as to form larger number of bonded parts, whereby such a carbon nanotube structure is formed that has microscopic antenna elements (electric pathways) having various lengths and various shapes inside. As a result, increase and fluctuation of electric resistance, which occur in the former carbon nanotube dispersion film, are prevented from occurring, and the high electroconductivity as a characteristic feature of carbon nanotubes can be effectively utilized.

The aforementioned carbon nanotube structure contains carbon nanotubes forming a network structure through plural bonded parts. Therefore, the excellent characteristics of the carbon nanotubes can be stably utilized as being different from such a material as the carbon nanotube dispersion film, in which carbon nanotubes are incidentally in contact with each other but are substantially isolated.

As a first preferred structure of the carbon nanotube structure constituting the crosslinked film, the carbon nanotube structure may contain the crosslinked parts formed by curing carbon nanotubes having a functional group and a crosslinking agent capable of reacting with the functional group, so as to cause a crosslinking reaction of the functional group contained in the carbon nanotube with the crosslinking agent.

In the carbon nanotube structure layer having the first structure, the crosslinked parts at which the plural carbon nanotubes are crosslinked, form a crosslinked structure, in which residual groups of the functional groups remaining after the crosslinking reaction are connected to each other through linking groups as residual groups of the crosslinking agent remaining after the crosslinking reaction, whereby the antenna element can have high efficiency and wide bandwidth.

In this case, it is preferred that the crosslinked parts have one chemical structure selected from the group consisting of —COO(CH$_2$)$_2$OCO—, —COOCH$_2$CHOHCH$_2$OCO—, —COOCH$_2$CH(OCO—) CH$_2$OH and —COOCH$_2$CH(OCO—)CH$_2$OCO—.

As a second preferred structure of the carbon nanotube structure constituting the crosslinked film, the crosslinked parts have a structure formed with a chemical bond of plural the functional groups.

In the carbon nanotube structure layer having the second structure, the plural carbon nanotubes are connected to each other by forming the crosslinked parts through chemical bond between the functional groups connected to the carbon nanotubes, so as to form the network structure, whereby the size of the crosslinked parts connecting the carbon nanotubes through the functional groups becomes constant. Because carbon nanotubes have an extremely stable chemical structure, there is a low possibility that other functional groups than the functional group intended to be modified are connected. In the case where the functional groups are chemically bonded, the crosslinked parts can have a designed structure to obtain a uniform carbon nanotube structure.

Furthermore, owing to the chemical bond between the functional groups, the length of the crosslinked parts among the carbon nanotubes can be shortened in comparison to the case where the functional groups are crosslinked by using a crosslinking agent. Therefore, a dense carbon nanotube structure is obtained to facilitate exhibition of the effects peculiar to carbon nanotubes.

It is preferred in this case that the crosslinked parts have at least one chemical structure selected from the group consisting of —COOCO—, —O—, —NHCO—, —COO—, —NCH—, —NH—, —S—, —O—, —NHCOO— and —S—S—.

Furthermore, the invention provides a process for producing a microwave antenna including a substrate; an antenna element supported on a surface of the substrate, the antenna element including a carbon nanotube structure constituting a network structure having a plurality of carbon nanotubes electrically connected to each other; and a power feeding electrode connected to the antenna element. The process includes applying a plurality of carbon nanotubes each having a functional group to a surface of the substrate, and crosslinking the functional groups with a chemical bond to form a crosslinked part, so as to form the carbon nanotube structure.

It is preferred that the process for producing a microwave antenna of the invention further includes a step of patterning the carbon nanotube structure to a desired shape subsequently to the crosslinking step. According to the provision of the patterning step, the carbon nanotube structure can be patterned into a desired shape.

The carbon nanotube structure in this stage has been stabilized by crosslinking the carbon nanotubes in the crosslinking step. The patterning in this state brings about no possibility of causing such a defect as scattering of the carbon nanotubes, and the structure can be patterned into a desired shape corresponding to the antenna element. Furthermore, since the film of the carbon nanotube structure itself is structured, connections among the carbon nanotubes are certainly attained, and an antenna utilizing the characteristics of the carbon nanotubes can be provided. In the conventional microwave antenna, such a pattern that corresponds to the radiation frequency thereof is necessarily formed. In the antenna element of the microwave antenna according to the invention, however, there is no limitation in shape thereof, and a desired form can be employed.

It is preferred in the invention that the carbon nanotube structure is patterned to have a desired area corresponding to the frequency, at which the antenna is utilized. For example, upon considering applications to portable phones and wireless LAN, an elliptical shape having an area of from 1.2 to 9 cm$^3$ is preferred, and upon considering applications to an antenna for the ETC (electronic toll collection) system using a higher frequency communication band, the use of an elliptical shape or a rectangular shape having an area of from 0.10 to 0.50 cm$^3$ is sufficient. One of the characteristic features of the antenna element in the invention is that it has wide bandwidth in a high frequency range, and thus an antenna element produced for portable phones and wireless LAN can also be used as an antenna element for the ETC system using a higher frequency.

The patterning step may be, for example, a step of removing the carbon nanotube structure on the surface of the substrate in an area other than a pattern corresponding to the desired shape by applying dry etching to the carbon nanotube structure in the area, so as to pattern the carbon nanotube structure to a pattern corresponding to the antenna element.

The patterning step may contain two steps of:

forming a resist layer (preferably a resin layer) on the carbon nanotube structure on the surface of the substrate in an area having a pattern corresponding to the desired shape; and removing the carbon nanotube structure exposed in an area other than the area having the resist layer formed thereon by applying dry etching (preferably irradiating with a radical of an oxygen molecule, which maybe generated by irradiating an oxygen molecule with an ultraviolet ray) to a surface having the carbon nanotube structure and the resist layer accumulated on the substrate.

In this case, the patterning step may further contain, a step of removing the resist layer formed in the resist layer forming step, subsequently to the removing step, so as to expose the carbon nanotube structure thus patterned.

In this embodiment, the patterning step may also be a step of removing the carbon nanotube structure on the surface of the substrate in an area other than a pattern corresponding to the desired shape by selectively irradiating the carbon nanotube structure in the area with an ion beam of an ion of a gas molecule, so as to pattern the carbon nanotube structure to a pattern corresponding to the antenna element.

The method for directly making the carbon nanotube structure into a desired shape includes, such a method that, in the applying step, the carbon nanotubes each having a functional group and a crosslinking agent causing a crosslinking reaction with the functional group are applied to an area on the surface of the substrate corresponding to the desired shape by the screen printing process, and then the operation of the crosslinking step is effected.

The aforementioned method is preferred since the production cost can be reduced.

As a first preferred method for forming the crosslinked parts among the functional group through chemical bond in the applying step of the process for producing a microwave antenna according to the invention, is a method for closslinking the functional groups by a closslinking agent. In other words, the crosslinking agent that crosslinks the functional groups may further be applied to the surface of the substrate in the applying step.

In the applying step for applying the carbon nanotubes each having a functional group and the crosslinking agent causing a crosslinking reaction with the functional group to the surface of the substrate, they are applied to the whole or a part of the surface. In the subsequent curing step, they are cured to form a carbon nanotube structure constituting a network structure containing the plural carbon nanotubes crosslinked with each other. The carbon nanotube structure thus obtained is used as the antenna element.

According to the first method, the structure of the carbon nanotube structure can be stabilized on the surface of the substrate. It is preferred in the applying step that a solution (crosslinking solution) containing the carbon nanotubes, the crosslinking agent and a solvent is applied to the surface of the substrate, and in particular, the solution is coated as a coating composition to form a crosslinked film, in the case where the microwave antenna according to the invention is produced to have a thin form.

The crosslinking agent is preferably a non-self-polymerizable crosslinking agent. In the case where the crosslinking agent has, as characteristics thereof, such a nature that molecules thereof cause a polymerization reaction with each other (self-polymerization property), there is a possibility that a polymer formed by connecting two or more molecules of the crosslinking agent is contained in the linking groups to reduce the substantial concentration of the carbon nanotubes in the carbon nanotube structure, and therefore, the antenna element may not sufficiently exhibit electroconductivity to bring about low efficiency.

Furthermore, in the case where a self-polymerizable crosslinking agent is used as the crosslinking agent, and the crosslinking agent itself causes a polymerization reaction during or before the crosslinking reaction in the crosslinking step, the bond of the crosslinking agent grows and is prolonged, and the carbon nanotubes bonded thereto are necessarily estranged.

In this case, the extent of reaction owing to the self-polymerization property of the crosslinking agent is practically difficult to be controlled, and the crosslinked structure among the carbon nanotubes is fluctuated corresponding to the polymerization state of the crosslinking agent.

In the case where a non-self-polymerizable crosslinking agent is used, however, the crosslinking agent is not polymerized by itself upon or before the crosslinking step, and at the crosslinked part of the carbon nanotubes, only one residual group remaining after the crosslinking reaction of the crosslinking agent is present between the residual groups remaining after the crosslinking reaction of the functional groups. As a result, the carbon nanotube structure thus obtained is uniformized in overall characteristics, and in the case where the layer thereof is patterned in the patterning step, fluctuation in characteristics of the carbon nanotube structure after patterning can be significantly suppressed.

In the case where the crosslinking agent is not crosslinked by itself, the distances among the carbon nanotubes can be controlled even though plural kinds of non-self-polymerizable crosslinking agents are mixed, and the carbon nanotubes are crosslinked with the plural crosslinking agents, whereby fluctuation in characteristics can be suppressed. In the case where the carbon nanotubes are crosslinked stepwise by using different kinds of crosslinking agents, on the other hand, the skeleton of the network structure of the carbon nanotubes can be formed to have controlled distances among the carbon nanotubes by using a non-self-polymerizable crosslinking agent in the first crosslinking step, and therefore, in the later crosslinking steps, a self-polymerizable crosslinking agent or a crosslinking agent capable of being crosslinked with the first crosslinking agent (or a residual group thereof) may be used.

Furthermore, in the case where the crosslinking agent is a non-self-polymerizable crosslinking agent, the distances among the carbon nanotubes can be controlled to the size of one unit of the chemical structure after the crosslinking reaction (which is referred to as a residual group) of the crosslinking agent used, and thus a desired network structure of the carbon nanotubes can be obtained with high reproducibility. Moreover, in the case where the size of the residual group of the crosslinking agent is small, the distances of the carbon nanotubes can be controlled to such a state that they are physically and electrically closed to each other, and the carbon nanotubes in the structure can be densely structured.

Therefore, by using the non-self-polymerizable crosslinking agent, the carbon nanotube structure of the invention has a network structure having more various electric pathways, and the electric pathways have various capacitances and inductances, so as to provide an antenna with higher efficiency and wider bandwidth. The term "self-polymerization property" referred herein means such a nature that molecules of a crosslinking agent cause a polymerization reaction with each other in the presence of other component, such as water, or the absence of other component, and the term "non-self-polymerization property" referred herein means such a property that has no aforementioned nature.

In the case where a non-self-polymerizable crosslinking agent is employed, furthermore, the crosslinked parts where the carbon nanotubes are crosslinked with each other in the carbon nanotube structure mainly have the same crosslinked structure. The aforementioned linking group is preferably one containing a hydrocarbon skeleton, which preferably has from 2 to 10 carbon atoms. The length of the crosslinked part can be reduced by decreasing the carbon number, so as to reduce sufficiently the distances among the carbon nanotubes in comparison to the length of the carbon nanotubes themselves, and thus such a carbon nanotube structure can be obtained that has a network structure substantially constituted only from carbon nanotubes. Consequently, the antenna element of the microwave antenna can have excellent radiation efficiency.

Preferred examples of the functional group include —OH, —COOH, —COOR (wherein R represents a substituted or unsubstituted hydrocarbon group), —COX (wherein X represents a halogen atom), —NH$_2$ and —NCO. At least one group selected from the group consisting of the aforementioned ones is preferably selected. In this case, as the crosslinking agent, such a crosslinking agent is selected that is capable of undergoing a crosslinking reaction with the functional group thus selected.

Preferred examples of the crosslinking agent include a polyol, a polyamine, a polycarboxylic acid, a polycarboxylate ester, a polycarboxylic acid halide, a polycarbodiimide and a polyisocyanate. At least one selected from the group consisting of the aforementioned ones is preferably selected. In this case, as the functional group, such a functional group is selected that is capable of undergoing a crosslinking reaction with the crosslinking agent thus selected.

It is preferred that at least one functional group selected from the aforementioned group exemplified as preferred functional groups and at least one crosslinking agent selected from the aforementioned group exemplified as preferred crosslinking agents are combined in such a manner that the functional group and the crosslinking agent selected are capable of undergoing a crosslinking reaction with each other.

The functional group is particularly preferably —COOR (wherein R represents a substituted or unsubstituted hydrocarbon group). A carboxyl group can be relatively easily introduced into a carbon nanotube, and furthermore, the resulting substance (i.e., carbon nanotube carboxylic acid) is rich in reactivity, whereby the functional group can be relatively easily converted to —COOR (wherein R represents a substituted or unsubstituted hydrocarbon group) through subsequent esterification. The functional group easily causes a crosslinking reaction and is suitable for forming a crosslinked product.

Preferred examples of the crosslinking agent corresponding to the aforementioned functional group include a polyol. A polyol easily forms a firm crosslinked product through curing upon reaction with —COOR (wherein R represents a substituted or unsubstituted hydrocarbon group). It is preferred that the crosslinking agent is at least one selected from the group consisting of glycerin, ethylene glycol, butenediol, hexynediol, hydroquinone and naphthalenediol since they are good in reactivity with the functional group and also have high biodegradability by themselves to provide less environmental burden.

In the case where the functional group is —COOR (wherein R represents a substituted or unsubstituted hydrocarbon group), and the crosslinking agent used is ethylene glycol, the crosslinked part where the plural carbon nanotubes are crosslinked with each other is —COO(CH$_2$)$_2$OCO—. In the case where the crosslinking agent used is glycerin, the crosslinked part is —COOCH$_2$CHOHCH$_2$OCO— or —COOCH$_2$CH(OCO—)CH$_2$OH where two OH groups contribute to the crosslinking reaction, or is —COOCH$_2$CH(OCO—)CH$_2$OCO— where three OH groups contribute to the crosslinking reaction. The chemical structure of the crosslinked part may be one selected from the aforementioned four chemical structures.

In the process for producing a microwave antenna according to the invention, in the case of the first method, it is possible in the applying step that a solution containing the plural carbon nanotubes each having a functional group, the crosslinking agent and a solvent is applied to the surface of the substrate. The crosslinking agent may also function as the solvent depending on the kind of the crosslinking agent.

As a second preferred method for forming the crosslinked parts among the functional group through chemical bond in the applying step of the process for producing a microwave antenna according to the invention, the plural functional groups are chemically bonded to each other.

According to the second method, the size of the crosslinked parts where the carbon nanotubes are bonded with the functional groups becomes constant. Because carbon nanotubes have an extremely stable chemical structure, there is a low possibility that functional groups other than the functional group intended to be modified are connected. In the case where the functional groups are chemically bonded, the crosslinked parts can have a designed structure to obtain a uniform carbon nanotube structure.

Furthermore, owing to the fact that chemical bond between the functional groups, the length of the crosslinked parts among the carbon nanotubes can be shortened in comparison to the case where the functional groups are crosslinked by using a crosslinking agent. Therefore, a dense carbon nanotube structure is obtained to facilitate exhibition of the effects peculiar to carbon nanotubes.

Preferred examples of the reaction of chemically bonding the functional groups include a dehydration reaction, a substitution reaction, an addition reaction and an oxidation reaction.

In the process for producing a microwave antenna according to the invention, it is possible that molecules each containing the functional group are bonded to the carbon nanotubes, which are then chemically bonded at the parts of the functional group, so as to constitute the crosslinked parts.

In the applying step, an additive causing the chemical bond of the functional groups may further be applied to the surface of the substrate.

In the case where the reaction of chemically bonding the functional groups is a dehydration condensation reaction, the additive is preferably a condensing agent. Preferred examples of the condensing agent include at least one selected from the group consisting of sulfuric acid, N-ethyl-N'-(3-methylaminopropyl)carbodiimide and dicyclohexylcabodiimide.

Preferred examples of the functional group used in the dehydration condensation reaction include at least one selected from the group consisting of —COOR (wherein R represents a substituted or unsubstituted hydrocarbon group), —COOH, —COX (wherein X represents a halogen atom), —OH, —CHO and —$NH_2$.

The functional group used in the dehydration condensation reaction is particularly preferably —COOH. A carboxyl group can be relatively easily introduced into a carbon nanotube, and furthermore, the resulting substance (i.e., carbon nanotube carboxylic acid) is rich in reactivity. Accordingly, the functional groups for forming the network structure can be easily introduced into plural positions on one carbon nanotube, and the functional group is suitable for forming the carbon nanotube structure since it is liable to undergo the dehydration condensation reaction.

In the case where the reaction of chemically bonding the functional groups is a substitution reaction, the additive is preferably a base. Preferred examples of the base include at least one selected from the group consisting of sodium hydroxide, potassium hydroxide, pyridine and sodium ethoxide. Preferred examples of the functional group used in this case include at least one selected from the group consisting of —$NH_2$, —X (wherein X represents a halogen atom), —SH, —OH, —$OSO_2CH_3$ and —$OSO_2(C_6H_4)CH_3$.

In the case where the reaction of chemically bonding the functional groups is an addition reaction, the functional group is preferably —OH and/or —NCO.

In the case where the reaction of chemically bonding the functional groups is an oxidation reaction, the functional group is preferably —SH. In this case, although it is not necessary that the additive is always added, it is preferred that an oxidation reaction accelerator is added as the additive. Preferred examples of the oxidation reaction accelerator include iodine.

In the second method in the process for producing a microwave antenna according to the invention, it is possible that the plural carbon nanotubes each having the functional group and the additive depending on necessity are contained in a solvent to form a solution, and the solution is applied to the surface of the substrate.

As having been described, the invention can provide a high efficiency microwave antenna capable of meeting the demands including small size and wide bandwidth by utilizing effectively the characteristics of carbon nanotubes, and a process for producing the same.

The invention will be described in detail below as the microwave antenna and the process for producing the same, separately.

Microwave Antenna

One of the characteristic features of the microwave antenna according to the invention resides in that the antenna element as a constitutional member of the antenna is mainly constituted by a carbon nanotube structure having a network structure containing plural carbon nanotubes electrically connected to each other. The microwave antenna according to the invention will be described with reference to the following two embodiments.

First Embodiment

Figure 2:
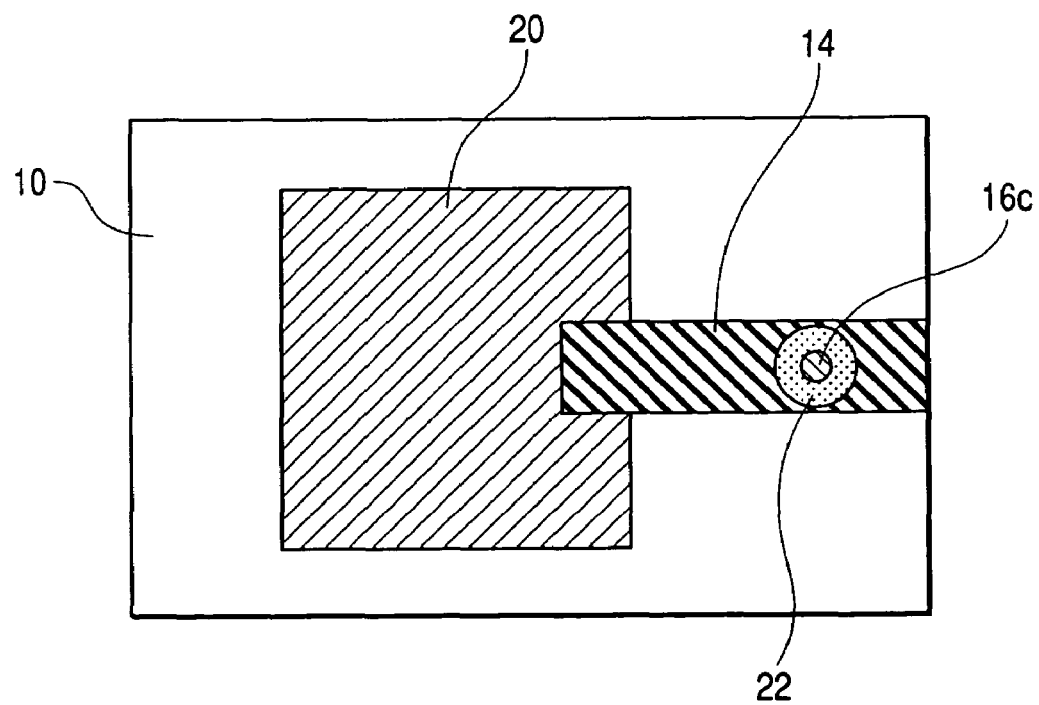
FIG. 2 is a plane view showing the microwave antenna in FIG. 1 viewed from the above.

FIG. 1 is a schematic cross sectional view showing a microwave antenna (hereinafter, sometimes simply referred to as an antenna) according to a first embodiment as a preferred example of the invention. FIG. 2 is a plane view thereof viewed from the above in FIG. 1.

A dielectric substrate (substrate) 10 in a plate form has formed on the surface thereof a layer of an antenna element (antenna element layer 20), and a metallic electrode (earth electrode) 12 is disposed on the back surface thereof. On one edge of the antenna element layer 20 formed into a rectangular shape, a metallic wiring (applying electrode) 14 for applying electric power is provided to cover the same. In the antenna according to this embodiment as an example of the invention, the antenna element layer 20 is constituted by a carbon nanotube structure.

The antenna is constituted to be capable of being connected to an exterior. In this embodiment as shown in FIG. 1, the back surface (earth surface) of the dielectric substrate 10 is connected to the exterior through a coaxial wiring 16. A coaxial core wire 16c is connected to the metallic wiring 14 through a via hole 24 formed from the earth surface of the dielectric substrate 10 to the surface of the metallic electrode 12, and fixed thereto with solder 22. A coaxial shielding wire 16a is connected to the metallic electrode 12 as the earth electrode and fixed thereto with solder 18.

In the coaxial wiring 16, the coaxial core wire 16c and the coaxial shielding wire 16a are insulated with an insulating layer 16b. According to the constitution, it becomes possible that the coaxial wiring 16 as a power feeding line is not disposed on the surface of the dielectric substrate, on which the antenna element layer 20 is provided, so as to prevent radiation interference from occurring. It is also possible that a microstrip line is directly formed on the metallic electrode 12 or the metallic wiring 14.

In the antenna according to this embodiment, the antenna element layer 20 functioning as an antenna element is constituted by a carbon nanotube structure having a network structure containing plural carbon nanotubes electrically connected to each other. Therefore, electric pathways having plural polygonal shapes and various sizes are formed therein derived from the network structure, and the electric pathways have various capacitances and inductances. Accordingly, such an antenna can be obtained that has an extremely wide responsive frequency range and a significantly good radiation efficiency.

The members constituting the embodiment will be described later.

Second Embodiment

Figure 3:
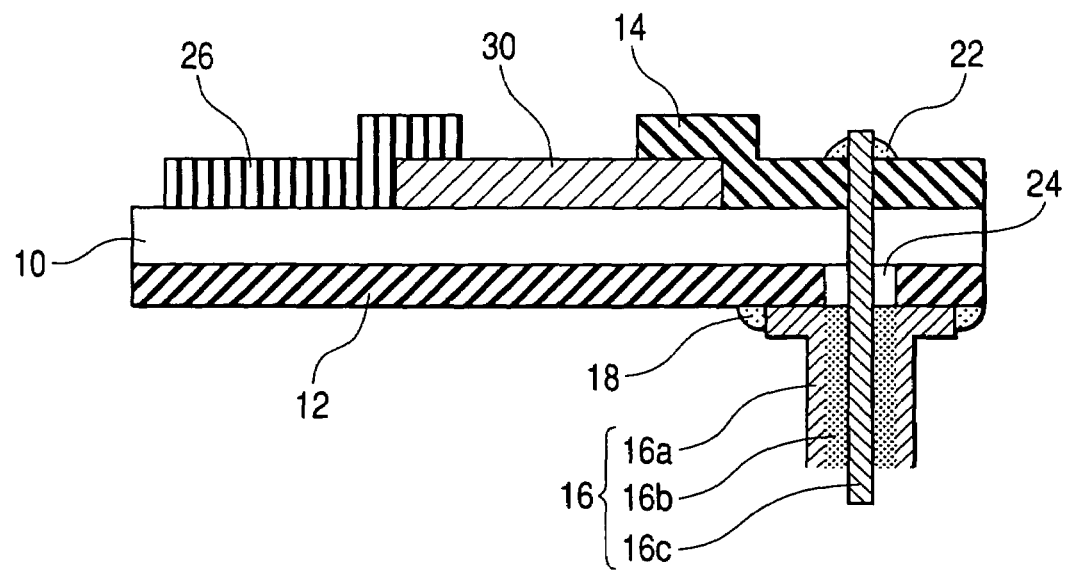
FIG. 3 is a schematic cross sectional view showing a microwave antenna according to another preferred example of the invention.
Figure 4:
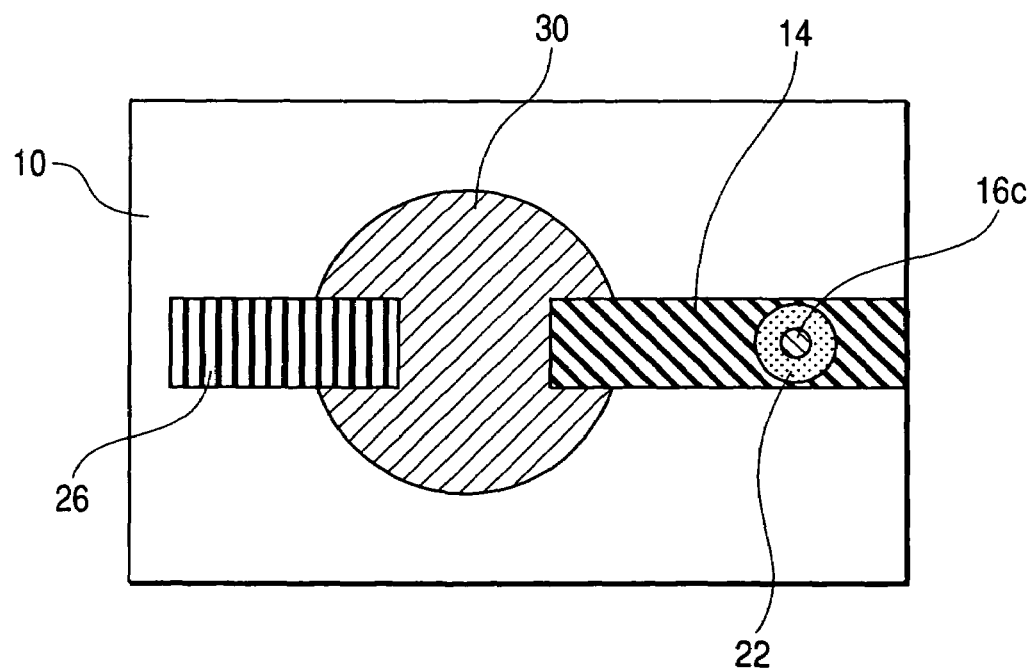
FIG. 4 is a plane view showing the microwave antenna in FIG. 3 viewed from the above.

FIG. 3 is a schematic cross sectional view showing a microwave antenna according to a second embodiment as a preferred example of the invention. FIG. 4 is a plane view thereof viewed from the above in FIG. 3. The antenna according to this embodiment is different from the antenna of the first embodiment in the constitution of the antenna element layer and the surrounding thereof. The constitutions of the other parts are the same as those in the first embodiment, and therefore, the same symbols are attached to the members having the same functions as in the first embodiment.

This embodiment is different from the first embodiment in such a point that the antenna element is constituted by an antenna element layer and a metallic pattern (second conductor) 26. The antenna element layer 20 in the first embodiment is in a rectangular shape, whereas the antenna element layer 30 of this embodiment has an elliptic shape. The shape of the antenna is not particularly limited in the invention, and can be appropriately designed under consideration of the frequency range where the antenna is utilized, as having been described.

The metallic pattern 26 as the second conductor is electrically connected to the antenna element layer 30 at the position opposite to the position where the metallic wiring (power feeding electrode) 14. According to the constitution, the radiation characteristics ascribed to the metallic pattern 26 can be utilized in addition to the radiation characteristics ascribed to the antenna element layer 30 constituted by the carbon nanotube structure, and therefore, the degree of freedom in element design is enhanced to improve the radiation characteristics as the overall element. In this case, it is expected that the antenna element layer 30 constituted by the carbon nanotube structure also functions as an impedance controller for the metallic pattern 26 and the power feeding line (such as the metallic wiring 14), in addition to the primary function as the antenna element. Therefore, it is expected that the metallic pattern 26 functions as a second antenna element.

The constitutional members will be described in detail below.

Constitutions of Members

The constitutions of the members will be described in detail.

The material for the dielectric substrate (substrate) 10 is not particularly limited, and for example, a glass-epoxy resin composite material, glass, silicone, alumina, sapphire, polycarbonate and polyfluorene may be utilized.

The method for patterning the carbon nanotube structure if necessary upon forming the layer of the antenna element in the invention includes, depending on the shape of the substrate, the case where the carbon nanotube structure layer can be patterned directly on the surface of the substrate, the case where the patterned carbon nanotube structure layer is utilized after attaching to the second substrate along with the substrate supporting the structure, and the case where only the patterned carbon nanotube structure layer is transferred to the substrate.

In particular, the microwave antenna according to the invention can be easily produced, as described later, even in the case where a substrate having flexibility or plasticity is used as the substrate, and since the carbon nanotube structure formed as the antenna element on the surface of the substrate has a crosslinked structure, there is low risk of breaking the carbon nanotube structure upon flexure deformation of the substrate carrying the structure on the surface thereof, so as to lower the fluctuation in characteristics of the antenna. Examples of the substrate having flexibility or plasticity include various resins, such as polyethylene, polypropylene, polyvinyl chloride, polyamide, polyimide and polyfluorene.

The materials that can be used as the metallic electrode 12 constituting the earth surface and the metallic wiring 14 for power feeding are not particularly limited, and materials excellent in electroconductivity are preferably used, with gold, copper, an aluminum alloy and chromium being utilized. In the second embodiment, the metallic pattern 26 formed as the second conductor maybe formed by using the similar material. The metallic electrode 12, the metallic wiring 14 and the metallic pattern 26 in the second embodiment may be formed by using the same metal or may be formed by using different metals, respectively.

The formation method of the electrodes and the like (the metallic electrode 12, the metallic wiring 14 and the metallic pattern 26) is not particularly limited, and the method having been known in the art may be employed.

The antenna element layers 20 and 30, in which the characteristic features of the invention reside, will be described.

The antenna element layers 20 and 30 in the embodiments each is a layer formed with a carbon nanotube structure constituting a network structure containing plural carbon nanotubes crosslinked with each other. In the invention, however, the carbon nanotube structure constituting the antenna element may not always have a crosslinked structure, and may constitute a network structure containing plural carbon nanotubes electrically connected to each other. In the case of the carbon nanotube structure of the embodiments constituting a network structure containing carbon nanotubes crosslinked with each other, the carbon nanotubes certainly form bonded parts by chemical bond in addition to electric connection by physical contact, so as to form a larger amount of bonded parts, and therefore, such a carbon nanotube structure is obtained that has microscopic antenna elements (electric pathways) having various lengths and shapes thereinside. As a result, increase and fluctuation in electric resistance, which occur upon using the so-called carbon nanotube dispersion film as an antenna element, are prevented from occurring, and thus, the high electroconductivity as a property peculiar to carbon nanotubes can be effectively utilized.

An arbitrary method may be used for forming the layer formed with the carbon nanotube structure constituting the crosslinked network structure as far as the layer having the constitution can be obtained. The process for producing a microwave antenna according to the invention described later is particularly preferred since the antenna can be produced easily at low cost with an antenna element having high performance, and such various advantages can be obtained that the characteristics can be easily uniformized and controlled. In the embodiments, the antenna element layers 20 and 30 are constituted by the carbon nanotube structure produced by the production process.

Hereinafter, the carbon nanotube structure having the aforementioned constitution will be mainly described.

A first preferred method for crosslinking plural carbon nanotubes each having a functional group (i.e., forming crosslinked parts among the functional groups through chemical bond in the applying step of the process for producing a microwave antenna according to the invention described later) is a method of crosslinking the plural functional groups with a crosslinking agent. A second preferred method therefor is a method of chemically bonding the plural functional groups directly with no crosslinking agent.

Carbon Nanotube

The carbon nanotubes as a main constitutional element in the invention may be single wall carbon nanotubes or multi-wall carbon nanotubes having two or more layers. The selection of the carbon nanotubes including mixtures thereof maybe appropriately made under consideration of the purpose of the antenna and the production cost.

Those materials as varieties of the single wall carbon nanotubes that have no tubular shape in strict meaning maybe used as the carbon nanotubes in the invention, example of which include carbon nanohorns (having a horn shape where the diameter thereof is continuously increased from one end to the other end), carbon nanocoils (having a coil form in a spiral shape in total), carbon nanobeads (having a tube at the center, which penetrates a spherical bead formed with amorphous carbon and the like), cup-stacked carbon nanotubes, and carbon nanotubes having carbon nanohorns or amorphous carbon covering the outer periphery thereof.

Metal-containing carbon nanotubes encompassing a metal or the like in carbon nanotubes, peapod carbon nanotubes encompassing fullerene or metal-containing fullerene in carbon nanotubes, and carbon nanotubes encompassing some other kinds of substances may also be used as the carbon nanotubes in the invention.

As having been described, in addition to the ordinary carbon nanotubes, carbon nanotubes in various configurations, such as varieties thereof and carbon nanotubes having been variously modified, can be used in the invention without any problem from the standpoint of reactivity thereof. Therefore, the concept "carbon nanotubes" referred in the invention includes all those materials.

The carbon nanotubes can be synthesized by the arc discharge process, a laser ablation process and the CVD process, which have been known in the art, which are not limited in the invention. Among these, the arc discharge process carried out in a magnetic field is preferred since carbon nanotubes having high purity can be synthesized.

The carbon nanotubes used preferably have a diameter of from 0.3 to 100 nm. In the case where the diameter of the carbon nanotubes exceeds the range, synthesis thereof is difficult to be attained, and it is not preferred from the standpoint of cost. The upper limit of the diameter of the carbon nanotubes is more preferably 30 nm.

The lower limit of the diameter of the carbon nanotubes is generally about 0.3 nm in consideration of the structure thereof. There are some cases where the yield upon synthesis is lowered when they are too thin, and therefore, it is preferably 1 nm or more, and more preferably 10 nm or more.

The carbon nanotubes used preferably have a length of from 0.1 to 100 μm. In the case where the length of the carbon nanotubes exceeds the range, it is not preferred from the standpoint of cost since synthesis thereof is difficult to be attained or necessitates a special process. In the case where the length is less than the range, it is not preferred since the number of crosslinking points per one carbon nanotube is decreased. The upper limit of the length of the carbon nanotubes is more preferably 10 μm, and the lower limit thereof is more preferably 1 μm.

In the case where the carbon nanotubes to be used have not higher purity, it is preferred that the purity is improved by purifying before preparing a crosslinking solution. The higher the purity is, the better in the invention, but specifically, the purity is preferably 90% or more, and more preferably 95% or more. In the case where the purity is too low, carbon products, such as amorphous carbon and tar, as impurities are crosslinked with the crosslinking agent to fluctuate the crosslinking distance among the carbon nanotubes, whereby there are some cases where the desired characteristics cannot be obtained. The purifying method of the carbon nanotubes is not particularly limited, and the methods having been known in the art can be employed.

The carbon nanotubes are added with prescribed functional groups and then applied to the formation of the carbon nanotube structure. Preferred examples of the functional group added herein for the first method are different from those for the second method. Hereinafter, the functional group for the first method is referred to as a functional group 1, and that for the second method is referred to as a functional group 2.

The method for introducing the functional group into the carbon nanotube will be described later for the preparation method of the crosslinking solution.

The constitutional components capable of being used for forming the carbon nanotube structure will be described below for the first method and the second method separately.

First Method

In the first method where the crosslinked parts are formed by using a crosslinking agent, the functional group contained in the carbon nanotubes is not particularly limited as far as it can be chemically added to the carbon nanotubes and can undergo a crosslinking reaction with some kind of a crosslinking agent, and an arbitrary functional group may be selected. Specific examples of the functional groups include —COOR, —COX, —MgX, —X (wherein x represents a halogen atom), —OR, —NR$^1$R$^2$, —NCO, —NCS, —COOH, —OH, —NH$_2$, —SH, —SO$_3$H, —R'CHOH, —CHO, —CN, —COSH, —SR and —SiR'$_3$ (wherein R, R1, R2 and R' each independently represents a substituted or unsubstituted hydrocarbon group), but it is not limited thereto.

Among these, it is preferred to select at least one group selected from the group consisting of —OH, —COOH, —COOR (wherein R represents a substituted or unsubstituted hydrocarbon group), —COX (wherein X represents a halogen atom), —NH$_2$ and —NCO, and in this case, the crosslinking agent is a crosslinking agent capable of undergoing a crosslinking reaction with the functional group thus selected.

In particular, —COOR (wherein R represents a substituted or unsubstituted hydrocarbon group) is particularly preferred since a carboxyl group can be relatively easily introduced into the carbon nanotubes, and the resulting substance (i.e., carbon nanotube carboxylic acid) can be easily introduced as the functional group through esterification and is rich in reactivity with the crosslinking agent.

The substituent R in the functional group —COOR is a substituted or unsubstituted hydrocarbon group and is not particularly limited, and it is preferably an alkyl group having from 1 to 10 carbon atoms, more preferably an alkyl group having from 1 to 5 carbon atoms, and particularly preferably a methyl group or an ethyl group, from the standpoint of reactivity, solubility, viscosity and usability as a solvent for a coating composition.

The amount of the functional groups thus introduced varies depending on the length and the thickness of the carbon nanotubes, the structure of the carbon nanotubes, i.e., the single wall or the multi-wall, the species of the functional group, and the purpose of the antenna, and cannot be determined unconditionally, and it is preferably such an amount that two or more functional groups are attached to one carbon nanotube from the standpoint of strength of the resulting crosslinked product, i.e., the strength of the crosslinked film.

Crosslinking Agent

In the first method, a crosslinking agent is essential. Any crosslinking agent may be used that undergoes a crosslinking reaction with the functional group contained in the carbon nanotubes. In other words, the species of the crosslinking agent that can be selected is restricted to some extent depending on the species of the functional group. The curing conditions (e.g., heating, ultraviolet ray irradiation, visible ray irradiation and spontaneous curing) is also determined depending on the combination thereof.

Preferred examples of the crosslinking agent include a polyol, a polyamine, a polycarboxylic acid, a polycarboxylate ester, a polycarboxylic acid halide, a polycarbodiimide and a polyisocyanate, and in this case, the functional group is a functional group capable of undergoing a crosslinking reaction with the crosslinking agent thus selected.

It is preferred that at least one functional group and at least one crosslinking agent are selected from the group of the preferred functional groups and the group of the preferred crosslinking agents, respectively, in such a manner that they are capable of undergoing a crosslinking reaction. Examples of the combinations of the functional group contained in the carbon nanotubes and the crosslinking agent capable of being reacted therewith are shown in Table 1 below along with the curing conditions therefor.

TABLE 1

| Functional group contained in carbon nanotubes | Crosslinking agent | Curing condition |
|---|---|---|
| —COOR | polyol | heat curing |
| —COX | polyol | heat curing |
| —COOH | polyamine | heat curing |
| —COX | polyamine | heat curing |
| —OH | polycarboxylate ester | heat curing |
| —OH | polycarboxylic acid halide | heat curing |
| —NH$_2$ | polycarboxylic acid | heat curing |
| —NH$_2$ | polycarboxylic acid halide | heat curing |
| —COOH | polycarbodiimide | heat curing |
| —OH | polycarbodiimide | heat curing |
| —NH$_2$ | polycarbodiimide | heat curing |
| —NCO | polyol | heat curing |
| —OH | polyisocyanate | heat curing |
| —COOH | ammonium complex | heat curing |
| —COOH | hydroquinone | heat curing |

Note:
R: substituted or unsubstituted hydrocarbon group
X: halogen atom

Among these combinations, preferred examples thereof include combinations of —COOR (wherein R represents a substituted or unsubstituted hydrocarbon group) good in reactivity as the functional group with a polyol, a polyamine, an ammonium complex, congo red and cis-platin. The terms "polyol", "polyamine" and "ammonium complex" referred herein are generic names of organic compounds having two or more OH groups, NH$_2$ groups and ammonium groups, respectively, and among these, compounds having from 2 to 10 (preferably from 2 to 5) carbon atoms and from 2 to 22 (preferably from 2 to 5) OH groups are preferred from the standpoint of crosslinking property, compatibility with a solvent upon excessive addition, processability of a waste liquid through biodegradation after reaction (environmental compatibility), and yield in polyol synthesis. In particular, the carbon number is preferably as small as possible within the aforementioned range since the distances among the carbon nanotubes in the resulting crosslinked film can be narrowed to obtain an (approximate) contact state. Specifically, glycerin and ethylene glycol are particularly preferred, and one or both thereof are preferably used as the crosslinking agent.

In a different perspective, the crosslinking agent is preferably a non-self-polymerizable crosslinking agent. Glycerin and ethylene glycol as exemplified as the polyol, as well as butenediol, hexynediol, hydroquinone and naphthalenediol, are non-self-polymerizable crosslinking agents, and in more generic definition, the non-self-polymerizable crosslinking agent has no such a combination of functional groups therein that undergo a polymerization reaction with each other. In other words, the self-polymerizable crosslinking agent has such a combination of functional groups therein that undergo a polymerization reaction with each other (for example, an alkoxide).

In order to form the carbon nanotube structure, the plural carbon nanotubes each having the functional group and the crosslinking agent are applied to the surface of the substrate (i.e., the applying step in the process for producing a microwave antenna according to the invention), and the functional groups are chemically bonded to form the crosslinked parts (i.e., the crosslinking step of the process for producing a microwave antenna according to the invention). For forming the antenna of the invention in a thin form, it is preferred upon applying the plural carbon nanotubes each having the functional group and the crosslinking agent that they are applied to the surface of the substrate as a solution (crosslinking solution) containing them along with a solvent, and it is particularly preferred that the solution is coated as a coating composition to form a crosslinked film.

The content of the carbon nanotubes in the crosslinking solution varies depending on the length and the thickness of the carbon nanotubes, the structure of the carbon nanotubes, i.e., the single wall or the multi-wall, the species and the amount of the functional group contained therein, the species and the amount of the crosslinking agent, the presence or absence, the species and the amounts of the solvent and the other additives, and the like, and cannot be determined unconditionally. It is preferably such a high concentration that a favorable crosslinked film can be formed after curing, but the concentration is preferably not too high for preventing the coating applicability from being deteriorated.

The specific proportion of the carbon nanotubes may be, while it cannot be determined unconditionally as having been noted, selected from a range of from 0.01 to 10 g/L, preferably from 0.1 to 5 g/L, and more preferably from 0.5 to 1.5 g/L, based on the total amount of the crosslinking solution.

The content of the crosslinking agent in the crosslinking solution varies depending on the species of the crosslinking agent (self-polymerizable or non-self-polymerizable), and also depending on the length and the thickness of the carbon nanotubes, the structure of the carbon nanotubes, i.e., the single wall or the multi-wall, the species and the amount of the functional group contained therein, the presence or absence, the species and the amounts of the solvent and the other additives, and the like, and cannot be determined unconditionally. In particular, glycerin, ethylene glycol and the like have a not higher viscosity by themselves and can also function as a solvent, and therefore, they may be added in an excessive amount.

In the crosslinking solution, the solvent may be added in the case where the coating applicability is insufficient only with the crosslinking agent. The solvent that can be used herein is not particularly limited and can be selected depending on the species of the crosslinking used. Specific examples thereof include an organic solvent, such as methanol, ethanol, isopropanol, n-propanol, butanol, methyl ethyl ketone, toluene, benzene, acetone, chloroform, methylene chloride, acetonitrile, diethyl ether and tetrahydrofuran, water, an acidic aqueous solution and an alkaline aqueous solution. The addition amount of the solvent may be appropriately determined under consideration of the coating applicability and is not particularly limited.

Second Method

In the second method, in which the plural functional groups are chemically bonded to each other directly without a crosslinking agent to form the crosslinked parts, the functional group contained in the carbon nanotubes is not particularly limited and may be an arbitrary functional group, as far as it can undergo chemical addition reaction of the carbon nanotubes and can react the functional groups themselves with each other upon addition of some kind of an additive. Specific examples of the functional group include —COOR, —COX, —MgX, —X (wherein x represents a halogen atom), —OR, —NR$^1$R$^2$, —NCO, —NCS, —COOH, —OH, —NH$_2$, —SH, —SO$_3$H, —R'CHOH, —CHO, —CN, —COSH, —SR and —SiR'$_3$ (wherein R, R1, R2 and R' each independently represents a substituted or unsubstituted hydrocarbon group), but it is not limited thereto.

As the reaction for chemically bonding the functional groups with each other, a dehydration condensation reaction, a substitution reaction, an addition reaction and an oxidation reaction are particularly preferred. Preferred examples of the functional group for the dehydration condensation reaction include —COOR (wherein R represents a substituted or unsubstituted hydrocarbon group), —COOH, —COX (wherein X represents a halogen atom), —OH, —CHO and —NH$_2$, those for the substitution reaction include —NH$_2$, —X (wherein X represents a halogen atom), —SH, —OH, —OSO$_2$CH$_3$ and —OSO$_2$(C$_6$H$_4$)CH$_3$, those for the addition reaction include —OH and —NCO, and those for the oxidation reaction include —SH.

It is also possible that a molecule having the functional group as a part thereof is bonded to the carbon nanotubes, which are then chemically bonded at the part of the preferred functional groups. In this case, the length of the crosslinked parts can be controlled since the functional group having a large molecular weight is bonded to the carbon nanotubes in the intended manner.

Upon chemically bonding the functional groups with each other, an additive that causes the chemical bonds among the functional groups may be used. Any additive may be used that causes reaction among the functional groups contained in the carbon nanotubes. In other words, the species of the additive that can be selected is restricted to some extent depending on the species of the functional group. The curing conditions (e.g., heating, ultraviolet ray irradiation, visible ray irradiation and spontaneous curing) is also determined depending on the combination thereof.

In the case where the reaction of chemically bonding the functional groups is a dehydration condensation reaction, a condensing agent is preferably added as the additive. Preferred examples of the condensing agent include at least one selected from the group consisting of sulfuric acid, N-ethyl-N'-(3-methylaminopropyl)carbodiimide and dicyclohexyl-cabodiimide. In this case, the functional groups are selected in such a manner that they undergo reaction among them with the condensing agent thus selected.

The functional group used in the dehydration condensation reaction is preferably at least one selected from the group consisting of —COOR (wherein R represents a substituted or unsubstituted hydrocarbon group), —COOH, —COX (wherein X represents a halogen atom), —OH, —CHO and —NH$_2$.

The functional group used in the dehydration condensation reaction is particularly preferably —COOH. A carboxyl group can be relatively easily introduced into a carbon nanotube, and furthermore, the resulting substance (i.e., carbon nanotube carboxylic acid) is rich in reactivity. Accordingly, the functional groups for forming the network structure can be easily introduced into plural positions per one carbon nanotube, and the functional group can easily undergo dehydration condensation and is suitable for forming the carbon nanotube structure. In the case where the functional group used in the dehydration condensation reaction is —COOH, particularly preferred examples of the condensing agent include sulfuric acid, N-ethyl-N'-(3-methylaminopropyl)carbodiimide and dicyclohexylcabodiimide.

In the case where the reaction of chemically bonding the functional groups is a substitution reaction, a base is preferably added as the additive. The base that can be added is not particularly limited, and an arbitrary base can be selected depending on the acidity of the hydroxyl group. Specific examples of the base include sodium hydroxide, potassium hydroxide, pyridine and sodium ethoxide, and it is preferred to select at least one base selected from the group consisting of them. In this case, the functional groups are selected in such a manner that they undergo reaction among them with the base thus selected.

The functional group used in this case is preferably at least one selected from the group consisting of —NH$_2$, —X (wherein X represents a halogen atom), —SH, —OH, —OSO$_2$CH$_3$ and —OSO$_2$(C$_6$H$_4$)CH$_3$.

In the case where the reaction of chemically bonding the functional groups is an addition reaction, the additive is not always necessary. The functional group in this case is preferably —OH and/or —NCO.

In the case where the reaction of chemically bonding the functional groups is an oxidation reaction, the additive is not always necessary, and an oxidation reaction accelerator is preferably added as the additive. Preferred examples of the oxidation reaction accelerator include iodine. The functional group in this case is preferably —SH.

It is preferred that at least two kinds of functional groups are selected from the groups of the preferred functional groups having been described in such a manner that the functional groups are reacted with each other, and the functional groups are added to the carbon nanotubes. Preferred examples of the combination of the functional groups (A) and (B) capable of undergoing the crosslinking reaction with each other contained in the carbon nanotubes, and the reaction name corresponding thereto are listed in Table 2 below.

TABLE 2

| Crosslinked part | Functional group contained in carbon nanotubes | | Reaction |
|---|---|---|---|
| | (A) | (B) | |
| —COOCO— | —COOH | —COOH | dehydration condensation |
| —S—S— | —SH | —SH | oxidation |
| —O— | —OH | —OH | dehydration condensation |
| —NH—CO— | —COOH | —NH$_2$ | dehydration condensation |
| —COO— | —COOH | —OH | dehydration condensation |
| —COO— | —COOR | —OH | dehydration condensation |
| —COO— | —COX | —OH | dehydration condensation |
| —CH=N— | —CHO | —NH$_2$ | dehydration condensation |
| —NH— | —NH$_2$ | —X | substitution |
| —S— | —SH | —X | substitution |

TABLE 2-continued

| Crosslinked part | Functional group contained in carbon nanotubes (A) | (B) | Reaction |
|---|---|---|---|
| —O— | —OH | —X | substitution |
| —O— | —OH | —OSO$_2$CH$_3$ | substitution |
| —O— | —OH | —SO$_2$(C$_6$H$_4$)CH$_3$ | substitution |
| —NH—COO— | —OH | —N=C=O | addition |

Note:
R: substituted or unsubstituted hydrocarbon group
X: halogen atom

In order to form the carbon nanotube structure, the plural carbon nanotubes each having the functional group and, depending on necessity, the additive are applied to the surface of the substrate (i.e., the applying step in the process for producing a microwave antenna according to the invention), and the functional groups are chemically bonded to form the crosslinked parts (i.e., the crosslinking step of the process for producing a microwave antenna according to the invention). For forming the antenna of the invention in a thin form, it is preferred upon applying the plural carbon nanotubes each having the functional group that they are applied to the surface of the substrate as a solution (crosslinking solution) containing them along with a solvent, and it is particularly preferred that the solution is coated as a coating composition to form a crosslinked film.

The concept relating to the content of the carbon nanotubes in the crosslinking solution is basically the same as in the first method.

The content of the additive in the crosslinking solution varies depending on the species of the additive, and also depending on the length and the thickness of the carbon nanotubes, the structure of the carbon nanotubes, i.e., the single wall or the multi-wall, the species and the amount of the functional group contained therein, the presence or absence, the species and the amounts of the solvent and the other additives, and the like, and cannot be determined unconditionally.

In the crosslinking solution, the solvent may be added in the case where the coating applicability is insufficient only with the crosslinking agent. The solvent that can be used herein is not particularly limited and can be selected depending on the species of the additive used. Specific examples of the species of the solvent and the addition amount thereof are the same as in the case of the solvent in the first method.

Other Additives

The crosslinking solution (including those of the first and the second methods) may contain other additives, such as a viscosity adjusting agent, a dispersant and a crosslinking accelerator.

The viscosity adjusting agent may be added in the case where the coating applicability is insufficient only with the crosslinking agent or the additive for bonding the functional groups. The viscosity adjusting agent that can be used is not particularly limited, and can be selected depending on the species of the crosslinking agent used. Specific examples thereof include methanol, ethanol, isopropanol, n-propanol, butanol, methyl ethyl ketone, toluene, benzene, acetone, chloroform, methylene chloride, acetonitrile, diethyl ether and tetrahydrofuran (THF).

Some of the viscosity adjusting agents function as a solvent depending on the addition amount thereof, and there is no significance to distinguish them clearly. The addition amount of the viscosity adjusting agent is not particularly limited and can be appropriately determined under consideration of the coating applicability.

The dispersant is added for maintaining dispersion stability of the carbon nanotube and the crosslinking agent or the additive for bonding the functional groups in the crosslinking solution, and various kinds of surfactants, water soluble organic solvents, water, acidic aqueous solutions and alkaline aqueous solutions having been known in the art can be used. However, the dispersant is not always necessary since the components of the crosslinking solution have high dispersion stability by themselves. There are some cases where impurities, such as the dispersant, are not contained in the crosslinked film depending on purposes of the crosslinked film thus formed, and in these cases, the dispersant is not added or is added in an amount as small as possible.

Preparation Method of Crosslinking Solution

The preparation method of the crosslinking solution will be described.

The crosslinking solution may be prepared by mixing the carbon nanotubes each having a functional group with the crosslinking agent that undergoes crosslinking reaction with the functional group or the additive for chemically bonding the functional group (mixing step) Prior to the mixing step, an addition step for introducing the functional group into carbon nanotubes.

In the case where carbon nanotubes each having a functional group are used as a starting material, only the operation of the mixing step may be carried out, and in the case where ordinary carbon nanotubes are used as a starting material, the operation may be started from the addition step.

The addition step is a step for introducing the desired functional group into carbon nanotubes. The introducing method varies depending on the species of the functional group and cannot be described unconditionally. The desired functional may be directly added, but it is also possible that a functional group that can be easily added is once introduced, and the a part of the functional group is substituted, or another functional group is added to the functional group, so as to obtain the target functional group.

Such another method may also be employed that a mechanochemical force is applied to carbon nanotubes to break or modify only small parts of graphene sheets on the surface of the carbon nanotubes, to which various kinds of functional groups are added.

The functional group can be relatively easily introduced to cup-stacked carbon nanotubes and carbon nanotubes formed through the vapor phase growing method having many defects on the surface there of upon production. However, carbon nanotubes having a complete graphene sheet structure are preferably used. This is because the characteristics of the carbon nanotubes can be effectively obtained, and owing to the easiness in controlling the characteristics, by using multi-wall carbon nanotubes, defects suitable for the antenna elements are formed on the outermost layer, to which the functional groups are bonded for crosslinking, and the inner layer having less structural defects is used for exhibiting the characteristics of the carbon nanotubes.

The operation of the addition step is not particularly limited, and all the methods having been known in the art maybe utilized. It is further described in Patent Document 1, which can be utilized in the invention depending on purposes.

A method for introducing —COOR (wherein R represents a substituted or unsubstituted hydrocarbon group), which is particularly preferred among the aforementioned functional groups, will be described. In order to introduce —COOR (wherein R represents a substituted or unsubstituted hydrocarbon group) into carbon nanotubes, (i) a carboxyl group is once introduced into carbon nanotubes, and then (ii) it is esterified.

(i) Addition of Carboxyl Group

In order to introduce a carboxyl group into carbon nanotubes, they may be refluxed with an acid having oxidation function. This operation is preferred since it can be relatively easily carried out, and a carboxyl group rich in reactivity can be added. The operation will be briefly described.

Examples of the acid having oxidation function include concentrated nitric acid, hydrogen peroxide, a mixed solution of sulfuric acid and nitric acid and aqua regia. In the case where concentrated nitric acid is used, in particular, the concentration thereof is preferably 5% by weight or more, and more preferably 60% by weight or more.

The reflux may be carried out according to the ordinary method, and the temperature is preferably around the boiling point of the acid used. For example, the temperature is preferably in a range of from 120 to 130° C. for concentrated nitric acid. The period of time for refluxing is preferably in a range of from 30 minutes to 20 hours, and more preferably from 1 to 8 hours.

Carbon nanotubes having carboxyl groups added (carbon nanotube carboxylic acid) are formed in the reaction solution after refluxing, which is cooled to room temperature and subjected to, depending on necessity, separation and washing, so as to obtain the target carbon nanotube carboxylic acid.

(ii) Esterification

The esterification of the resulting carbon nanotube carboxylic acid can be carried out by adding an alcohol through dehydration to introduce the target functional group —COOR. (wherein R represents a substituted or unsubstituted hydrocarbon group).

The alcohol used in the esterification is determined by the substituent R in the chemical formula of the functional group. That is, in the case where R represents $CH_3$, methanol is used, and in the case where R represents $C_2H_5$, ethanol is used.

In general, a catalyst is used for esterification, and a known catalyst, such as sulfuric acid, hydrochloric acid and toluenesulfonic acid, maybe used in the invention. In the invention, sulfuric acid is preferably used as the catalyst since it causes no side reaction.

The esterification can be carried out in such a manner that the alcohol and the catalyst are added to the carbon nanotube carboxylic acid and are refluxed at a suitable temperature for a suitable period of time. The temperature conditions and the time conditions herein vary depending on the species of the catalyst, the species of the alcohol, and the like, and cannot be determined unconditionally. The refluxing temperature is preferably around the boiling point of the alcohol used. For example, the temperature is preferably in a range of from 60 to 70° C. for methanol. The period of time for refluxing is preferably in a range of from 1 to 20 hours, and more preferably in a range of from 4 to 6 hours.

A reaction product is separated from the reaction solution after the esterification, followed by washing depending on necessity, so as to obtain carbon nanotubes having the functional group —COOR (wherein R represents a substituted or unsubstituted hydrocarbon group) added thereto.

In the mixing step, the carbon nanotubes each having a functional group are added with the crosslinking agent capable of undergoing crosslinking reaction with the functional group or the additive for bonding the functional groups, and a solvent depending on necessity, so as to prepare a crosslinking solution. In the mixing step, the other additives described in the chapter "Other Additives" may be mixed depending on necessity, in addition to the aforementioned components. It is preferred that the addition amounts of the solvent and the viscosity adjusting agent under consideration of the coating applicability to prepare a crosslinking solution immediately before applying (coating).

The mixing operation may be carried out by simply stirring with spatula or only stirring with a stirrer having stirring blades, a magnetic stirrer or a stirring pump, and the components may be strongly dispersed by using an ultrasonic dispersing machine or a homogenizer, whereby the carbon nanotubes are dispersed more uniformly to improve storage stability and to make a network structure formed by crosslinking the carbon nanotubes spread over the entire structure. In the case where a stirring machine having a strong shearing force for stirring, such as a homogenizer, is used, however, there is such a possibility that the carbon nanotubes contained are broken or damaged, and the stirring operation may be carried out for a short period of time.

The crosslinking solution having been described is coated on the surface of the substrate and cured to form a layer of the carbon nanotube structure. The methods for coating and curing will be described in the later chapter "Process for producing Microwave Antenna".

The preferred carbon nanotube structure constituting the network structure having plural carbon nanotubes crosslinked with each other has such a state that the carbon nanotubes are networked. More specifically, the carbon nanotube structure is cured in a matrix form, in which the carbon nanotubes are connected to each other through the crosslinked parts, and thus, the characteristics peculiar to carbon nanotubes, such as high transmission characteristics of electrons and holes, can be sufficiently exhibited. In other words, the carbon nanotubes structure contains carbon nanotubes closely connected and contains no other binder, and thus it is substantially formed only with carbon nanotubes, whereby the inherent characteristics of the carbon nanotubes can be exhibited to the maximum extent.

In the case where the carbon nanotube structure is formed in a layered form in the invention, the thickness of the layer may be selected from a wide range of from an extremely thin layer to a thick layer. An extremely thin crosslinked film can be obtained in the case where the content of the carbon nanotubes in the crosslinking solution used is lowered (for example, simply diluted to reduce the viscosity), and the solution is coated to a thin film form. A thicker crosslinked film can be obtained by increasing the content of the carbon nanotubes. Furthermore, a further thicker crosslinked film can be obtained by repeated coating the solution. The extremely thin crosslinked film may have a thickness of about 10 nm, and the thicker crosslinked film may have such a thickness that has no upper limit by repeatedly coating the solution. The thickness obtained by one time coating is about 5 μm. Moreover, a desired shape can be obtained by injecting the crosslinking solution having the content adjusted into a mold, followed by crosslinking.

In the case where the carbon nanotube structure is produced by the first method, such a crosslinked structure is obtained that the positions where the carbon nanotubes are crosslinked with each other, i.e., the residual groups remaining in the carbon nanotubes, are connected through linking groups, which are residual groups remaining in the crosslinking agent after the crosslinking reaction.

As having been described, in the crosslinking solution in this case, the crosslinking agent as one of the constitutional components thereof is preferably non-self-polymerizable. In the case where the crosslinking agent is non-self-polymerizable, the linking group in the carbon nanotube structure finally produced is constituted by only one residual group of the crosslinking agent, and thus the distances among the carbon nanotubes crosslinked can be controlled to the size of the residual group of the crosslinking agent, so as to obtain the desired network structure of the carbon nanotubes with high reproducibility. Furthermore, the crosslinking agent does not intervene plurally, and thus the substantial density of the carbon nanotubes in the carbon nanotube structure can be increased. The distances of the carbon nanotubes can be made in such a state that the carbon nanotubes are extremely close to each other electrically and physically (i.e., the carbon nanotubes are substantially directly in contact with each other) by decreasing the size of the residual group of the crosslinking agent.

In the case where the carbon nanotube structure is produced by using a crosslinking solution containing a sole kind of the functional groups in the carbon nanotubes and a sole kind of the non-self-polymerizable crosslinking agent, the crosslinked parts in the structure have the same crosslinked structure (which is referred to the case 1). In the case where the carbon nanotube structure is produced by using a crosslinking solution containing plural kinds of the functional groups in the carbon nanotubes and/or plural kinds of the non-self-polymerizable crosslinking agents, the crosslinked parts in the structure have, as a major part, the crosslinked structure having the combination of the functional group used and the non-self-polymerizable crosslinking agent used (which is referred to the case 2).

In the case where the carbon nanotube structure is produced-by using a crosslinking solution containing the self-polymerizable crosslinking agent, on the other hand, the crosslinked parts where the carbon nanotubes are crosslinked with each other in the carbon nanotube structure have a mixed state containing various kinds of linking groups having different numbers of the crosslinking agents linked (polymerized), and a particular one crosslinked structure cannot constitute a major part, irrespective as to whether the functional groups and the crosslinking agent are of a sole kind or plural kinds.

In other words, the use of the non-self-polymerizable crosslinking agent provides the crosslinked parts among the carbon nanotubes in the carbon nanotube structure are bonded to the functional group through only one residual group of the crosslinking agent, so as to provide mainly the same crosslinked structure. The term "mainly the same crosslinked structure" referred herein means such a concept that includes the case where the crosslinked parts in the structure have, as a major part thereof, the crosslinked structure having the combination of the functional group used and the non-self-polymerizable crosslinking agent used (the case 2), as well as the case where all the crosslinked parts have the same crosslinked structure (the case 1).

In the case of "mainly the same crosslinked structure", the lower limit of the "proportion of the crosslinked structure having the same structure" cannot be determined unconditionally because, for example, such a case can be considered that a functional group or a functional crosslinked structure having a different purpose from the formation of the network structure of the carbon nanotubes are applied to the crosslinked parts. However, in order to realize the higher electric and physical characteristics of the carbon nanotubes through the firm network, the "proportion of the crosslinked structure having the same structure" is preferably 50% or more, more preferably 70% or more, and further preferably 90% or more, in terms of the number of the crosslinked parts, and in the most preferred embodiment, all the crosslinked parts have the same structure. The proportion in terms of number can be obtained by such a method or the like that an intensity ratio of absorption spectra corresponding to the crosslinked structures is measured in an infrared spectrum.

In the case where of a carbon nanotube structure having crosslinked parts where the carbon nanotubes are crosslinked with each other having mainly the same crosslinked structure, the uniform network of carbon nanotubes can be formed in a desired state, whereby the electric and physical characteristics can be obtained uniformly and favorably, and furthermore, with the expected characteristics or with high reproducibility.

The linking group is preferably those having a hydrocarbon as a skeleton. The term "hydrocarbon as a skeleton" herein means that the main chain part of the linking group, which engages in linking the residual groups of the functional groups of the crosslinked carbon nanotubes remaining after the crosslinking reaction, is constituted by a hydrocarbon, and a side chain, which occurs by substituting a hydrogen atom of the main chain part by another substituent, is not considered. It is preferred that the entire linking group is constituted by a hydrocarbon.

The hydrocarbon preferably has from 2 to 10 carbon atoms, more preferably from 2 to 5 carbon atoms, and further preferably from 2 or 3 carbon atoms. The linking group is not particularly limited, as far as it has two or more valencies.

In the crosslinking reaction between the functional group —COOR (wherein R represents a substituted or unsubstituted hydrocarbon group) and ethylene glycol, which has been exemplified as a preferred combination of the functional group contained in the carbon nanotubes and the crosslinking agent, the crosslinked parts where the plural carbon nanotubes are crosslinked with each other have a structure —COO(CH$_2$)$_2$OCO—.

In the crosslinking reaction between the functional group —COOR (wherein R represents a substituted or unsubstituted hydrocarbon group) and glycerin, the crosslinked parts where the plural carbon nanotubes are crosslinked with each other have a structure —COOCH$_2$CHOHCH$_2$OCO— or —COOCH$_2$CH(OCO—)CH$_2$OH where two OH groups contribute to the crosslinking reaction, or a structure —COOCH$_2$CH(OCO—)CH$_2$OCO— where three OH groups contribute to the crosslinking reaction.

As having been described, the microwave antenna according to the invention in the case where the carbon nanotube structure is produced by the first method has a carbon nanotube structure having a network structure through plural crosslinked parts where plural carbon nanotubes are crosslinked with each other, and therefore, it can stably exhibit electric characteristics, such as high transmission characteristics of electrons and holes, physical characteristics, such as thermal conduction and toughness, and other characteristics, such as light absorption property, peculiar to carbon nanotubes, without the problems occurring in the simple carbon nanotube dispersion film, such as destabilization of contact state and arrangement state of carbon nanotubes.

In the case where the carbon nanotube structure is produced by the second method, the parts where the plural carbon nanotubes are crosslinked with each other, i.e., the crosslinked parts formed by the crosslinking reaction of the functional groups contained in the plural carbon nanotubes, have the crosslinked structure where the residual groups of the functional groups remaining after the crosslinking reaction are connected to each other. In this case, the carbon nanotube structure also contains carbon nanotubes connected to each other through the crosslinked parts in a matrix form, and exhibition of the characteristics peculiar to carbon nanotubes themselves, such as high transmission characteristics of electrons and holes, is facilitated. In other words, the carbon nanotubes structure contains carbon nanotubes closely connected and contains no other binder, and thus it is substantially formed only with carbon nanotubes.

Furthermore, the substantial density of the carbon nanotubes in the carbon nanotube structure can be increased owing to the crosslinked parts formed by directly reacting the functional groups, and the distances among the carbon nanotubes can be reduced to obtain such a state that the carbon nanotubes are extremely close to each other electrically and physically by reducing the size of the functional groups, whereby exhibition of the characteristics of the carbon nanotubes themselves can be further facilitated.

The structure contains mainly the same crosslinked structure owing to the crosslinked parts formed by chemical bond of the functional groups, and therefore, the uniform network of carbon nanotubes can be formed in a desired state, whereby the electric and physical characteristics can be obtained uniformly and favorably, and furthermore, with the expected characteristics or with high reproducibility.

Moreover, because the pattern itself over the antenna element (antenna element layer 20 or 30) becomes in complementary use, the pattern of the carbon nanotube structure thus formed is of higher degree of freedom, and the antenna element may have various shapes, in both cases of using the first and second methods.

The microwave antenna according to the invention may have another layer formed in addition to the layer of the carbon nanotube structure used as the antenna element. For example, it is preferred to provide an adhesion layer between the surface of the substrate and the antenna element layer formed with the carbon nanotube structure for improving adhesion them since the adhesion strength of the antenna element layer formed with the patterned carbon nanotube structure can be improved. The formation method and other detailed matter of the adhesion layer will be described in the chapter "Process for producing Microwave Antenna".

A protective layer and other various functional layers may be provided as an upper layer of the antenna element layer formed with the patterned carbon nanotube structure. By providing the protective layer formed as an upper layer of the antenna element layer formed with the carbon nanotube structure, the carbon nanotube structure as a network of crosslinked carbon nanotubes can be firmly retained on the surface of the substrate and can be protected from an external force. A resist layer, which will be described in the chapter "Process for producing Microwave Antenna", may not be removed but be left as it is and may be used as the protective layer. It is also effective that a protective layer is newly provided to cover the whole surface including the pattern corresponding to the antenna element. The material for constituting the protective layer may be various resin materials and inorganic materials having been known in the art without any problem depending on purposes.

The substrate may be a substrate having flexibility or plasticity as having been described. The use of the substrate having flexibility or plasticity improves the overall flexibility of the antenna element to enhance significantly the degree of freedom in use environment, such as the installation location. In the case where an apparatus is constituted by using an antenna using the substrate having flexibility or plasticity, the antenna element of the antenna can exhibit high performance in space saving while the antenna element is accommodated to various arrangements and shapes in the apparatus.

Specific examples of the shape or the like of the microwave antenna having been described will be apparent from the following chapter "Process for producing Microwave Antenna" and the chapter of examples later. The constitutions described herein below are mere examples, and the specific constitutions of the microwave antenna according to the invention are not limited to them.

Process for Producing Microwave Antenna

The process for producing a microwave antenna according to the invention (hereinafter, sometimes simply referred to as a production process of the invention) is suitable for producing the aforementioned microwave antenna according to the invention. Specifically, the process is a process for producing a microwave antenna containing a substrate, an antenna element supported on a surface of the substrate, and a power feeding electrode connected to the antenna element, in which the antenna element contains a carbon nanotube structure constituting a network structure having plural carbon nanotubes electrically connected to each other, and the process contains steps of:

(A) applying plural carbon nanotubes each having a functional group to a surface of the substrate; and (B) crosslinking the functional groups with a chemical bond to form a crosslinked part, so as to form the carbon nanotube structure.

The process may further include, subsequent to the crosslinking step (B), a step of (C) patterning the carbon nanotube structure thus formed to a desired shape, and other steps.

The process for forming the antenna element on the surface of the substrate will be described in detail below with reference to FIGS. 5A to 5E for the steps constituting the production process of the invention separately described.

FIGS. 5A to 5E are schematic cross sectional views showing the substrate for explaining an example (the section C-A-2 described later) of the method for forming the antenna element on the surface of the substrate in the production process of the invention. In the figures, numeral 112 denotes a substrate in a flat plate form, 114 denotes a carbon nanotube structure, and 116 denotes a resist layer.

(A) Applying Step

The "applying step" in the invention is a step of applying at least plural carbon nanotubes each having a functional group to a surface of the substrate. The aforementioned crosslinking solution may be used herein, and in the case where the antenna element is formed into a thin film form, the solution may be coated on the surface of the substrate.

An area, on which the crosslinking solution is applied, may contain at least an area, on which the antenna element is to be formed, and the solution may not necessarily be applied to the whole surface of the substrate.

Various methods may be employed in the applying step as far as the methods can dispose the crosslinking solution on the desired area on the surface of the substrate, or can make the solution in contact with the desired area, and the coating method is most preferred since the operation is simplest and accurate, and a carbon nanotube structure in a thin film form can be provided.

The coating method is not particularly limited and includes wide variation of methods, such as a method of dropping the solution or spreading the solution with a squeegee, and the ordinary coating method. Examples of the ordinary coating method include the spin coating method, the wire bar coating method, the cast coating method, the roll coating method, the brush coating method, the dip coating method, the spray coating method and the curtain coating method.

The substrate, the carbon nanotubes each having a functional group, the crosslinking agent, the additive and the contents of the crosslinking solution are the same as those described in the chapter "Microwave Antenna".

(B) Crosslinking Step

Figure 5A:
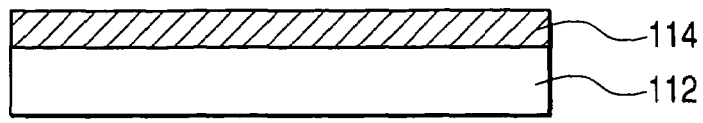
FIGS. 5A to 5E are schematic cross sectional views showing a substrate for explaining an example of the method for forming an antenna element on a surface of the substrate in the process for producing a microwave antenna of the invention according to the steps of the production process in the order of from FIGS. 5A to 5E.

The "crosslinking step" in the invention is a step of crosslinking the functional groups contained in the carbon nanotubes with a chemical bond to form a crosslinked part, so as to form the carbon nanotube structure. In the case where the applying step is a step of coating the crosslinking solution, it is a step of curing the crosslinking solution after coating to form the carbon nanotube structure containing the plural carbon nanotubes crosslinked with each other to form a network structure. The area, on which the carbon nanotube structure is to be formed, in the crosslinking step may contain at least the aforementioned desired area (i.e., the area, on which the antenna element is to be formed), and the entire solution coated on the surface of the substrate may not necessarily be cured. FIG. 5A is a schematic cross sectional view showing the surface of the substrate after completing the crosslinking step (B). FIG. 5A shows a state that the carbon nanotube structure 114 is formed on the surface of the substrate 112.

The operation in the crosslinking step is determined depending on the combination of the functional group and the crosslinking agent, as shown, for example, in Table 1. In the case of a thermosetting combination, the solution may be heated with various kinds of heaters, and in the case of an ultraviolet curing combination, the solution may be irradiated with an ultraviolet ray lamp or may be allowed to stand under the sun. In the case of a spontaneous curing combination, the solution may be allowed to stand as it is, and the operation of allowing to stand herein is encompassed in the operation carried out in the crosslinking step of the invention.

In the case of the combination of the functional group —COOR (wherein R represents a substituted or unsubstituted hydrocarbon group) and a polyol (particularly, glycerin and/or ethylene glycol), curing (polyesterification through ester exchanging reaction) is attained by heating. Upon heating, —COOR of the esterified carbon nanotube carboxylic acid and R'—OH (wherein R' represents a substituted or unsubstituted hydrocarbon group) of the polyol undergo ester exchanging reaction. The reaction proceeds plurally and multi-dimensionally to crosslink the carbon nanotubes, and finally the carbon nanotubes are connected to each other to form the carbon nanotube structure 114 having a network structure.

The preferred conditions for the aforementioned combination may be, for example, a heating temperature of from 50 to 500° C., and more preferably from 120 to 200° C. The heating time for the combination may be preferably from 1 minute to 10 hours, and more preferably from 1 to 2 hours.

(C) Patterning Step

Figure 5B:
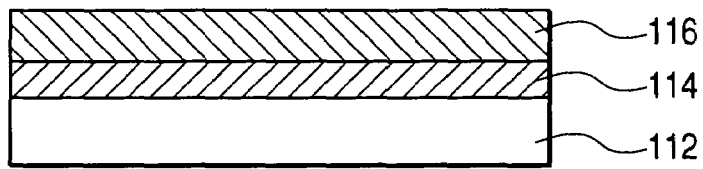

The "patterning step" in the invention is a step of patterning the carbon nanotube structure thus formed to a desired shape. However, such patterning is not necessary herein that is for forming a shape corresponding to a radiation wavelength and deflection in the conventional antenna element. Therefore, the patterning step is not essential in the invention. FIG. 5E is a schematic cross sectional view showing the surface of the substrate after completing the patterning step (C)

The operation of the patterning step is not particularly limited, and preferred examples thereof include the following two embodiments (C-A) and (C-B).

(C-A)

In this embodiment, the patterning step is a step of removing the carbon nanotube structure on the surface of the substrate in an area other than the pattern corresponding to the antenna element by applying dry etching to the carbon nanotube structure in the area, so as to pattern the carbon nanotube structure to the pattern corresponding to the antenna element.

The operation of applying dry etching to pattern into the pattern corresponding to the antenna element means eventually that the carbon nanotube structure on the surface of the substrate in an area other than the pattern is irradiated with radicals or the like. Examples of the method therefor include such an embodiment (C-A-1) that the carbon nanotube structure on the surface of the substrate in an area other than the pattern is directly irradiated with radicals or the like, and such an embodiment (C-A-2) that a resist layer is formed on the area other than the pattern, and then the whole of the surface of the substrate (on the side where the carbon nanotube structure and the resist layer are formed) is irradiated with radicals or the like.

(C-A-1)

In the embodiment (C-A-1) where the carbon nanotube structure in an area other than the pattern is directly irradiated with radicals or the like, more specifically, the patterning step is a step of removing the carbon nanotube structure on the surface of the substrate in the area other than the pattern corresponding to the antenna element by selectively irradiating the carbon nanotube structure in the area with an ion beam of an ion of a gas molecule, so as to pattern the carbon nanotube structure to the pattern corresponding to the antenna element.

An ion of a gas molecule can be selectively irradiated with precision in a several nanometer order by using an ion beam, and the use of an ion beam is preferred since the patterning operation for patterning into the pattern corresponding to the antenna element can be easily carried out by one step operation.

Examples of the gas species that can be selected include oxygen, argon, nitrogen, carbon dioxide and sulfur hexafluoride, and oxygen is particularly preferred in the invention.

The ion beam is such a system that gas molecules are ionized by applying voltage in vacuum and irradiated as a beam, and the substance to be etched and the irradiation accuracy can be changed by the species of the gas used.

(C-A-2)

In the embodiment (C-A-2) where a resist layer is formed on the area other than the pattern, and then the whole of the surface of the substrate is irradiated with radicals or the like, more specifically, the patterning step contains steps of:

(C-A-2-1) forming a resist layer on the carbon nanotube structure on the surface of the substrate in an area having a pattern corresponding to the antenna element; and (C-A-2-2) removing the carbon nanotube structure exposed in an area other than the area having the resist layer formed thereon by applying dry etching to the surface having the carbon nanotube structure and the resist layer accumulated on the substrate, and in some cases, the patterning step may further contain, subsequent to the removing step, a step of (C-A-2-3) removing the resist layer formed in the resist layer forming step.

(C-A-2-1)

In the resist layer forming step, a resist layer is formed on the carbon nanotube structure on the surface of the substrate in an area having a pattern corresponding to the antenna element. This step is carried out according to the process that is generally referred to as a lithography process, in which the resist layer is not directly formed on the carbon nanotube structure in the area having the pattern corresponding to the antenna element, but as shown in FIG. 5B, a resist layer 116 is once formed on the whole surface of the substrate 112 having the carbon nanotube structure 114 formed thereon, and then the area having the pattern corresponding to the antenna element is exposed and developed, whereby the part other than the exposed area is removed, and finally such a state is obtained that the resist layer is provided on the carbon nanotube structure in the area having the pattern corresponding to the antenna element.

Figure 5C:
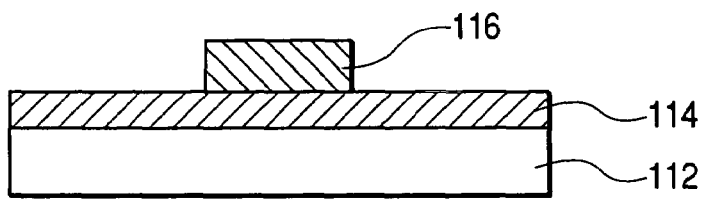

FIG. 5C is a schematic cross sectional view showing the surface of the substrate after completing the resist layer forming step (C-A-2-1). Depending on the species of the resist, there are cases where the exposed part is removed through development, and the non-exposed part remains.

The resist layer may be formed by the method having been known in the art. Specifically, a resist material is coated on the substrate by using a spin coater or the like and heated to form the resist layer.

The material (resist material) used for forming the resist layer 116 is not particularly limited, and various materials having been used as a resist material in the art can be used. Among these, the resist layer is preferably formed with a resin (i.e., a resin layer) is preferred. Because the carbon nanotube structure 114 forms a network and is a porous structure, in the case where the resist layer 116 is formed with such a material that forms a film only on the very surface but does not sufficiently penetrate into the pores, such as a metal vapor-deposition film, the carbon nanotubes cannot be sufficiently sealed upon irradiation of plasma or the like (i.e., cannot be sufficiently prevented from exposure to plasma or the like). Accordingly, there are some cases where the plasma or the like passes through the pores to erode the carbon nanotube structure 114 as a lower layer of the resist layer 116, and the outer shape of the carbon nanotube structure 114 remaining after the removing step is reduced due to wrap-around of the plasma or the like. It is possible that the outer shape (area) of the resist layer 116 is sufficiently broadened in comparison to the pattern corresponding to the antenna element as taking the reduction in size into consideration, but in this case, the distance between the patterns is necessarily large to fail to form a dense pattern.

In the case where the resist layer 116 is formed with a resin, on the other hand, the resin can penetrate into the pores to reduce the amount of the carbon nanotubes exposed to the plasma or the like, and as a result, the carbon nanotube structure 114 can be patterned highly densely.

Examples of the resin material that mainly forms the resin layer include a novolak resin, polymethyl methacrylate and a mixture of the resins, but the resin material is not limited to them.

The resist material for forming the resist layer is a mixture of the aforementioned resin material or a precursor thereof with a photosensitive material and the like, and resist materials having been known in the art may be used. Examples thereof include OFPR800, a trade name, produced by Tokyo Ohka Kogyo Co., Ltd., and NPR9710, a trade name, produced by Nagase & Co., Ltd.

The operation and conditions for the exposure (which can be appropriately selected depending on the species of the resin material, for example, a heating operation is used in the case where the resist material is a thermosetting material) and development of the resist layer 116, for example, the wavelength of the light source, the exposure intensity, the exposure time, the exposure amount, the environmental conditions for exposure, the developing method, the species and concentration of the developer solution, the developing time, the developing temperature, and the contents of the pretreatment and post-treatment, can be appropriately selected depending on the resist material used. In the case where a commercially available resist material is used, the operation and conditions may be selected according to the instruction manual of the resist material. In general, under consideration of convenience in handling, the exposure is made into the pattern corresponding to the antenna element by using an ultraviolet ray, and the development is carried out by using an alkali developer solution. After washing out the developer solution with water, the resist layer is dried to complete the photolithography process.

(C-A-2-2) Removing Step

Figure 5D:
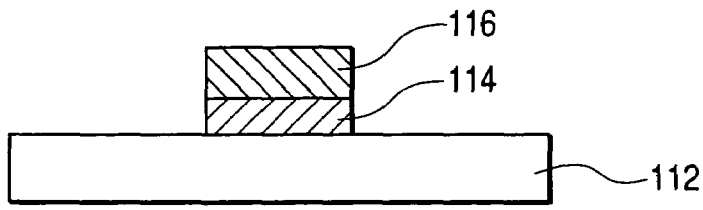
Figure 5E:
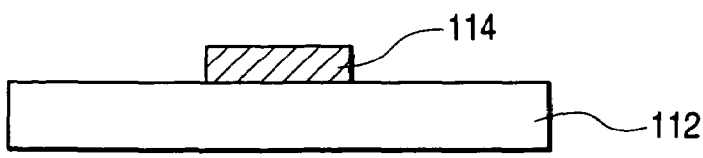

In the removing step, dry etching is applied to the surface having the carbon nanotube structure and the resist layer accumulated on the substrate, so as to remove the carbon nanotube structure exposed in an area other than the area (as shown in FIG. 5C, in which the carbon nanotube structure 114 is exposed on a part where the resist layer 116 is removed). FIG. 5D is a schematic cross sectional view showing the surface of the substrate after completing the removing step (C-A-2-2).

The operation of the removing step entirely includes such methods that are generally referred to as dry etching, and examples of the methods include the reactive ion etching method. The method using an ion beam having been described in the section (C-A-1) is also encompassed in the dry etching.

Examples of the gas species, apparatus and operation environment that can be employed are the same as those described in the section (C-A-1).

Examples of the gas species that can be generally selected in dry etching include oxygen, argon, nitrogen, carbon dioxide and sulfur hexafluoride, and oxygen is particularly preferred in the invention. The use of an oxygen radical oxidizes (burns out) the carbon nanotubes of the carbon nanotube structure 114 to be removed to convert to carbon dioxide, which forms no influencing matter remaining, and enables accurate patterning.

In the case where oxygen is selected as the gas species, an oxygen radical is generated by irradiating an oxygen molecule with an ultraviolet ray and is utilized for irradiation. An apparatus for generating an oxygen radical in this method is commercially available under the name of UV asher, which can be easily purchased.

(C-A-2-3) Resist Layer Removing Step

The process for producing a microwave antenna according to the invention may be completed in the stage where the operations until the removing step (C-A-2-2) are completed, and a microwave antenna according to one embodiment of the invention (as shown in FIG. 5D) can be obtained. In the case where the resist layer 116 is to be removed, however, an operation of the resist layer removing step, in which the resist layer 116 provided in the resist layer forming step is removed, is necessarily carried out subsequently to the removing step. FIG. 5E is a schematic cross sectional view showing the surface of the substrate after completing the resist layer removing step (C-A-2-3).

The operation of the resist layer removing step may be selected depending on the material used for forming the resist layer 116. In the case where a commercially available resist material is employed, the operation may be carried out according to the method in the instruction manual of the resist material. In the case where the resist layer 116 is a resin layer, in general, the resin layer can be removed by making it into contact with an organic solvent capable of dissolving the resin layer.

(C-B)

In this embodiment, the patterning step contains steps of:

forming a resist layer on the carbon nanotube structure on the surface of the substrate in an area having a pattern corresponding to the antenna element; and removing the carbon nanotube structure exposed in an area other than the area by making the surface having the carbon nanotube structure and the resist layer accumulated on the substrate into contact with an etching solution.

This embodiment is a method that is generally referred to as wet etching (i.e., a method of removing an arbitrary part by using a chemical solution as an etching solution).

The details of the resist layer forming step are the same as those in the aforementioned resist layer forming step (C-A-2-1) except that a resist material resistant to the etching solution is desirably used. The resist layer removing step may be applied subsequent to the removing step in this embodiment, and the details of the resist layer removing step may be the same as those described for the aforementioned resist layer removing step (C-A-2-3). Therefore, the descriptions for these steps are omitted herein.

As referring to FIG. 5C, in the removing step in this embodiment, the surface of the substrate 112 having the carbon nanotube structure 114 and the resist layer 116 accumulated thereon is made in contact with the etching solution, so as to remove the carbon nanotube structure 114 exposed in an area other than the area.

The operation "making in contact with the etching solution" in the invention such a concept that includes any operation of making a target into contact with the solution, and the target may be made in contact any method including dipping, spraying, curtain flowing and the like.

The etching solution is generally an acid or an alkali, and the species of the etching solution to be selected is determined by the resist material constituting the resist layer 116 and the crosslinked structure among the carbon nanotubes in the carbon nanotube structure 114. It is preferred to use such a material that is difficult to erode the resist layer 166 as much as possible and easily remove the carbon nanotube structure 114 as much as possible.

However, an etching solution that erodes the resist layer 116 may also be used in the case where the exposed carbon nanotube structure 114 can be removed before the resist layer 116 is completely diminished, by controlling the temperature and concentration of the etching solution and the period of time for contacting with the etching solution.

(D) Other Steps

The microwave antenna according to the invention can be produced through the aforementioned steps, and in the process for producing a microwave antenna according to the invention, other steps may be contained.

For example, it is preferred to provide a step of surface-treating the surface of the substrate prior to the applying step (particularly in the case where the applying step is carried out by coating). The surface-treating step is carried out, for example, for improving adsorbability of the crosslinking solution thus applied (coated), for improving adhesion between the surface of the substrate and the carbon nanotube structure formed as an upper layer, for cleaning the surface of the substrate, and for adjusting the electroconductivity of the surface of the substrate.

Examples of the surface-treating step for improving adsorbability of the crosslinking solution include a treatment with a silane coupling agent (such as aminopropyl triethoxysilane and γ-(2-aminoethyl)aminopropyl triethoxysilane). Among these, the surface treatment with aminopropyl triethoxysilane has been widely practiced and is preferred as the surface-treating step in the invention. The surface treatment with aminopropyl triethoxysilane has been used for a surface treatment of mica used in a substrate in AMF observation of DNA, as described in such literatures as Y. L. Lyubchenko, et al., *Nucleic Acids Research*, vol. 21, p. 1117–1123 (1993).

In the case where two or more layers of the carbon nanotube structures are accumulated, the aforementioned operations of the process for producing a microwave antenna of the invention may be repeated in two or more times.

In the case where other layers, such as a protective layer and an electrode layer, are separately accumulated, steps for forming these layers are necessary. The layers maybe appropriately formed by using materials and methods suitable for the purposes thereof selected from the conventional methods, or by using materials and methods newly developed for the invention.

<Application Example of Process for Producing Microwave Antenna of the Invention>

Examples of a useful application of the process for producing a microwave antenna according to the invention include such a method that upon forming the antenna element on the surface of the substrate, the carbon nanotube structure is once patterned on a surface of a provisional substrate, and then transferred to the desired substrate (transferring step). It is possible in the transferring step that the patterned carbon nanotube structure is once transferred from the provisional substrate to a surface of an intermediate transfer material, and then further transferred to the desired substrate (second substrate).

Examples of the provisional substrate that can be used in this application example include those materials described for the substrate in the chapter "Microwave Antenna", which are preferably used in this example. However, upon considering the transfer applicability in the transferring step, it preferably has at least one plane, and more preferably is in a plate form.

The substrate and the intermediate transfer material that can be used in this application example necessarily have an adhesive surface carrying an adhesive or a surface capable of carrying an adhesive, and ordinary adhesive tapes, such as a cellophane adhesive tape, a paper adhesive tape, a cloth adhesive tape and an imide adhesive tape, can be used. Those formed with hard materials other than these tapes formed with materials having flexibility or plasticity may also be used. In the case of a material having no adhesive carried thereon, an adhesive is coated on the surface capable of carrying the same, and then the material can be used as similar to the ordinary adhesive tapes with the surface as an adhesive surface.

According to the application example, the microwave antenna according to the invention can be easily produced.

It is also possible to produce the antenna in such a manner that a substrate having the carbon nanotube structure carried thereon is prepared, and they are attached all at once to a surface of a second substrate (such as a chassis) constituting a device.

In alternative, a carbon nanotube transfer material containing a provisional substrate (or an intermediate transfer material) having on a surface thereof the carbon nanotube structure carried thereon is used, only the carbon nanotube structure is transferred to a surface of a substrate constituting the antenna, with the provisional substrate (or the intermediate transfer material) being removed. In this case, a user can produce the antenna element of the antenna even though the crosslinking step is omitted. There are some cases where the intermediate transfer material functions as the provisional substrate of the carbon nanotube transfer material depending on the process, and these cases are encompassed in this example since it is not necessary to distinguish such a member as the carbon nanotube transfer material from the other embodiments.

In the case where the carbon nanotube transfer material is used, it can be significantly easily handled in the subsequent steps in the process owing to the carbon nanotube structure in the crosslinked state carried on the surface of the provisional substrate, and therefore, the production of the antenna can be significantly easily attained. The removing method of the provisional substrate may be appropriately selected, for example, from simple releasing, chemical decomposition, burning out, melting, sublimation and dissolution.

In the process for forming the antenna element on the surface of the substrate in this application example of the process for producing a microwave antenna according to the invention, the operations of the applying step, the crosslinking step and the patterning step may be the same as those in the aforementioned process for producing a microwave antenna except that the target of the coating, curing and patterning operations is changed from the substrate to the provisional substrate. What is changed in the process is that the transferring step is carried out subsequent to the patterning step. The patterning step will be described with reference to FIGS. 6A to 6D.

Figure 6A:
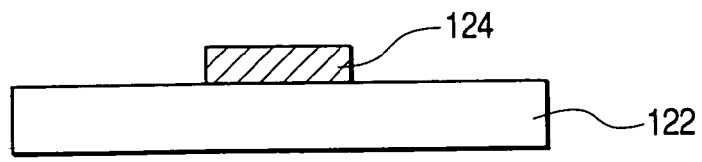
FIGS. 6A to 6D are schematic cross sectional views showing a substrate and a provisional substrate for explaining an application example of the method for forming an antenna element on a surface of the substrate in the process for producing a microwave antenna of the invention according to the steps of the production process in the order of from FIGS. 6A to 6D.

FIGS. 6A to 6D are schematic cross sectional views showing the provisional substrate and the substrate for explaining an example of the method for forming the antenna element on the surface of the substrate in the process for producing a microwave antenna according to the invention. In the figures, numeral 122 denotes a provisional substrate, 124 denotes a carbon nanotube structure, and 128 denotes a substrate. The carbon nanotube structure 124 has the same constitution as the carbon nanotube structure 114 in FIGS. 5A to 5E As shown in FIG. 6A, an assembly containing a provisional substrate 122 having on the surface thereof a carbon nanotube structure 124 is produced through the applying step, the crosslinking step and the patterning step having been described.

Figure 6B:
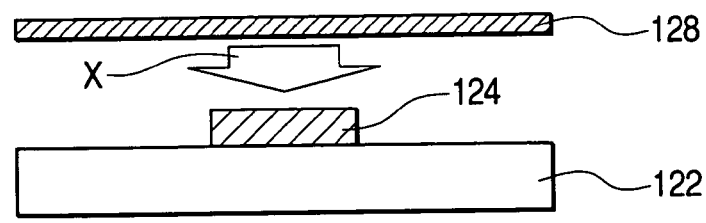
Figure 6C:
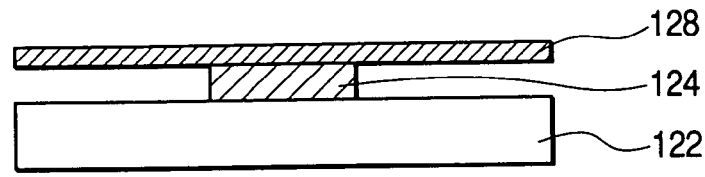

As shown in FIG. 6B, a substrate 128, such as an adhesive tape, is prepared and moved to the direction shown by the arrow X with the adhesive surface thereof facing the provisional substrate 122 having the carbon nanotube structure 124, and they are adhered to each other as shown in FIG. 6C.

Figure 6D:
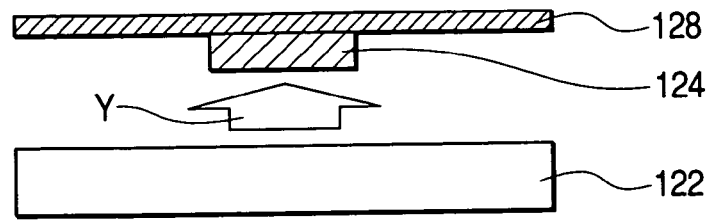

As shown in FIG. 6D, the substrate 128 is moved in the direction shown by the arrow Y to release it from the provisional substrate 122 having the carbon nanotube structure 124, whereby the carbon nanotube structure 124 having been formed on the provisional substrate 122 is thus transferred to the adhesive surface of the substrate 128.

According to the procedures, the carbon nanotube structure 124 is patterned on the substrate 128, and thus the carbon nanotube device according to the invention is produced.

The production process of an antenna according to this application example is particularly effective in the case where such a material and/or shape that is difficult to be applied to the process for producing a microwave antenna according to the invention is used as a substrate of a device.

For example, the application example is effective in the case where the heating temperature for curing the applied crosslinking solution in the crosslinking step is higher than the melting point or the glass transition point of the material used as the substrate of the antenna. In this case, the heating temperature is set at a temperature lower than the melting point of the provisional substrate, whereby the heating temperature necessary for curing can be ensured to produce suitably the microwave antenna according to the invention.

For example, furthermore, in the case where such a patterning step is employed that dry etching is applied to the carbon nanotube structure in an area other than the pattern corresponding to the antenna element on the surface of the provisional substrate, so as to remove the carbon nanotube structure in the area, whereby the carbon nanotube structure is patterned into the pattern corresponding to the antenna element, the application example is effective when the material used as the substrate of the antenna has no resistance to the dry etching applied in the patterning step. In this case, a material having resistance to the dry etching is used as the provisional substrate, whereby resistance to the operation of the step of patterning on the provisional substrate can be ensured to produce suitably the microwave antenna according to the invention.

Specific resistance and material vary depending on the conditions of dry etching, such as gas species, intensity, time, temperature and pressure, and cannot be determined unconditionally. Since a resin material generally has relatively low resistance, the advantages of the application example can be preferably enjoyed in the case where a resin material is used as the substrate. Furthermore, since a material having flexibility or plasticity generally has relatively low resistance, the advantages of the application example can be preferably enjoyed in the case where the material is used as the substrate.

As still another embodiment, in order to produce an antenna having better handleability, a substrate carrying the carbon nanotube structure 124 may be adhered to a second substrate to constitute a microwave antenna according to the invention and a device using the same. The second substrate may be physically rigid or may be flexible or plastic, and the shape thereof may be selected from variously, such as a spherical shape and an uneven shape.

While the invention has been described in detail with reference to the preferred embodiments, the invention is not construed as being limited to the embodiments, and various additions and modifications may be made in the constitutions thereof according to the knowledge having been known in the art unless the constitution of the invention is impaired thereby. All embodiments having the additions and modifications made therein are encompassed in the invention unless the embodiments fail to have the constitution of the invention.

For example, in the aforementioned embodiment, the metallic electrode (earth electrode) 12 as an earthing is disposed on the back surface of the dielectric substrate (substrate) 10 opposite to the side where the antenna element 20 or 30 is formed, but it is not necessary that the electrode is earthed at that position.

Upon providing an earth electrode, it may be provided on a surface of the substrate different from the surface supporting the antenna element (i.e., the back surface in the case of a plate substrate) as in the aforementioned embodiment, or in alternative, the earth electrode may be provided on the surface of the substrate supporting the antenna element in an area different from the area supporting the antenna element. In the case where the substrate has a sufficient thickness, the earth electrode may be provided inside the substrate.

EXAMPLE

The invention will be described in more detail with reference to the following examples, but the invention is not construed as being limited thereto.

Example 1

Figure 10:
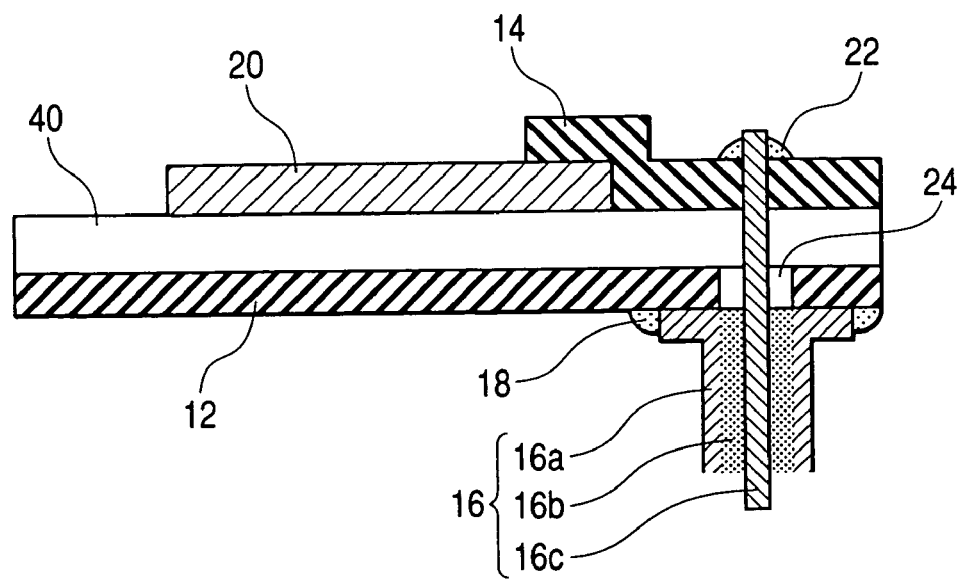
FIG. 10 is a schematic cross sectional view showing a microwave antenna produced in Example 1.
Figure 11:
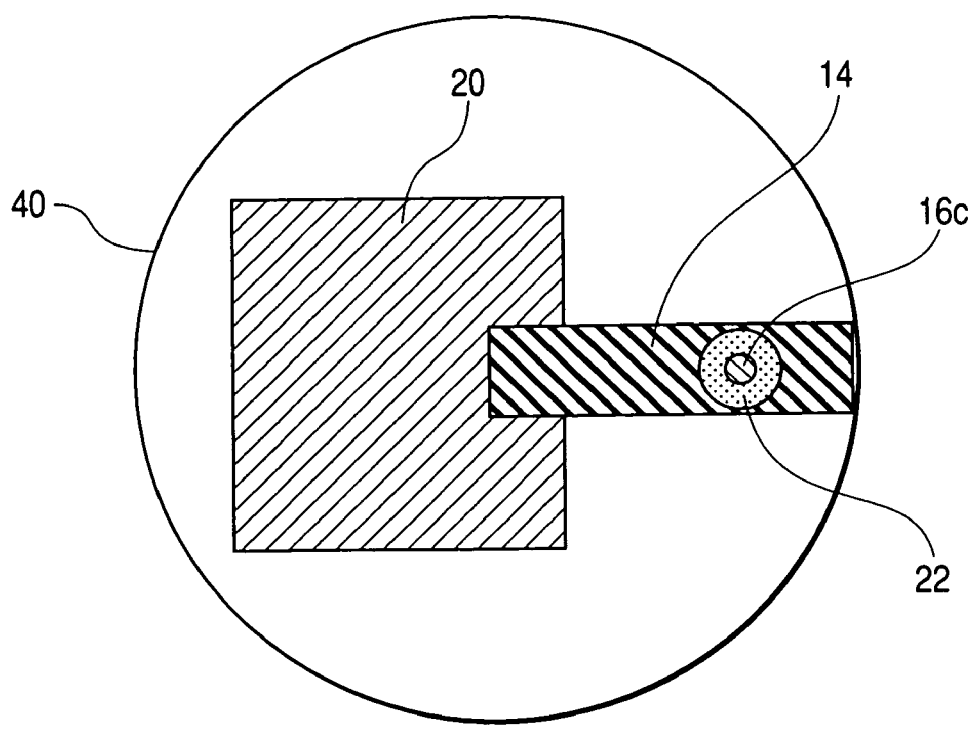
FIG. 11 is a plane view showing the microwave antenna in FIG. 10 viewed from the above.

In Example 1, a microwave antenna having a constitution shown in FIGS. 10 and 11 is produced according to the process for producing a microwave antenna shown in FIGS. 5A to 5E. FIG. 10 is a cross sectional view showing a microwave antenna produced in this example, and FIG. 11 is a plane view thereof viewed from the above in FIG. 10. The microwave antenna produced in this example has the same structure as the first embodiment except that the shape of the dielectric substrate (substrate) 40 is different, and therefore, the same symbols are attached to the members having the same functions, structures and shapes as in FIGS. 1 and 2.

In the description of this example, the symbols in FIGS. 5A to 5E are sometimes used.

(A) Applying Step (A-1) Preparation of Crosslinking Solution (Adding Step)

(i) Addition of Carboxyl Group (Synthesis of Carbon Nanotube Carboxylic Acid)

Figure 7:
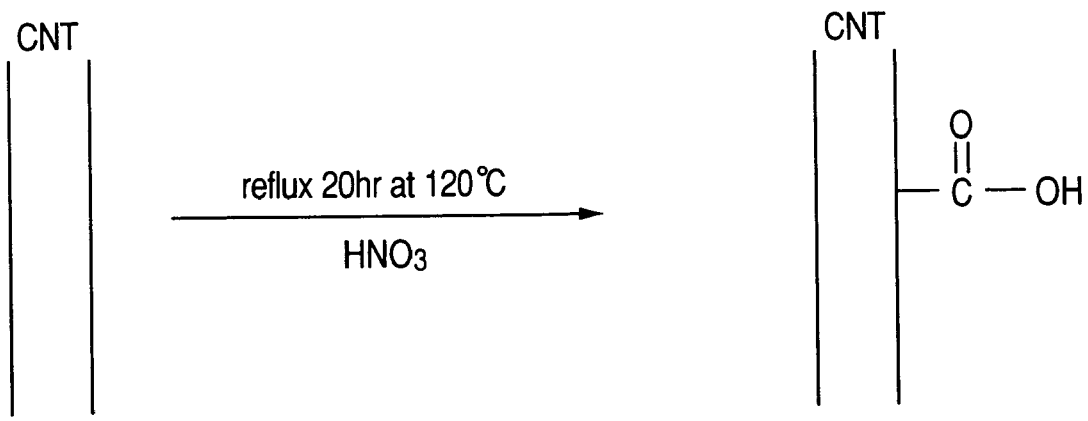
FIG. 7 is a reaction scheme showing synthesis of carbon nanotube carboxylic acid in the addition step in Example 1.

30 mg of multi-wall carbon nanotube powder (purity: 90%, average diameter 30 nm, average length: 3 μm, produced by Science Laboratories Co., Ltd.) is added to 20 mL of concentrated nitric acid (60% by mass aqueous solution, produced by Kanto Kagaku Co., Ltd.), and the mixture is refluxed at 120° C. for 20 hours to synthesize carbon nanotube carboxylic acid. The reaction scheme is shown in FIG. 7. In FIG. 7, the carbon nanotube (CNT) is expressed by two parallel lines (which is the same as in other figures relating to reaction schemes).

The temperature of the solution is lowered to room temperature, and the solution is subjected to centrifugal separation at 5,000 rpm for 15 minutes to separate a precipitate from a supernatant fluid. The precipitate thus recovered is dispersed in 10 mL of pure water and then again subjected to centrifugal separation at 5,000 rpm for 15 minutes to separate a precipitate from a supernatant fluid (thus, a washing operation has been completed once). The washing operation is repeated in further 5 times, and a precipitate is then finally recovered.

The precipitate thus recovered is measured for infrared absorption spectrum. For comparison, the multi-wall carbon nanotubes as the starting material are also measured for infrared absorption spectrum. The comparison of the spectra reveals that an absorption peak at 1,735 cm$^{-1}$, which is characteristic of carboxylic acid, is observed in the spectrum of the precipitate, but is not observed in the spectrum of the multi-wall carbon nanotube starting material. It is understood therefrom that carboxyl groups are introduced into the carbon nanotubes through the reaction with nitric acid. That is, it has been confirmed that the precipitate is carbon nanotube carboxylic acid.

It has been confirmed that the precipitate thus recovered is good in dispersibility by adding it in neutral pure water. The result supports the infrared absorption spectrum indicating that hydrophilic carboxyl groups are introduced into the carbon nanotubes.

Figure 8:
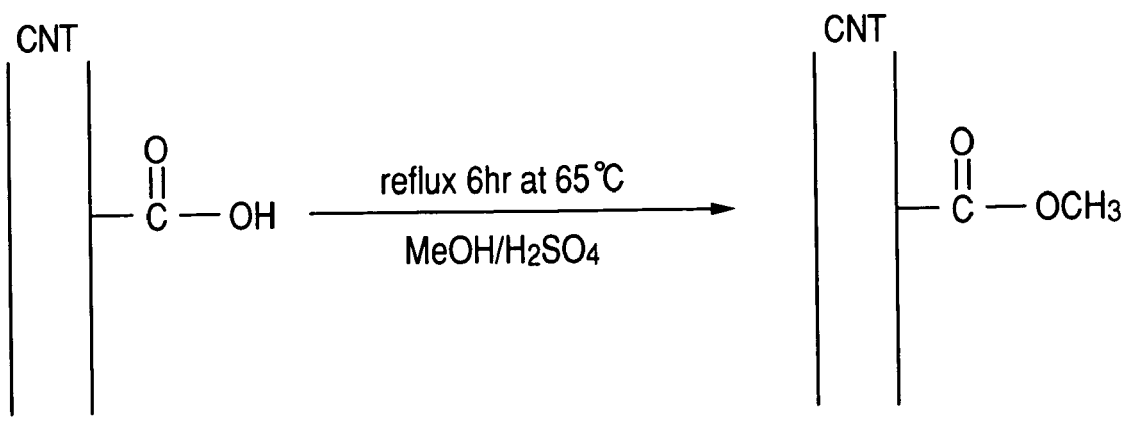
FIG. 8 is a reaction scheme showing esterification in the addition step in Example 1.

(ii) Esterification 30 mg of the carbon nanotube carboxylic acid thus prepared in the aforementioned step is added to 25 mL of methanol (produced by Wako Pure Chemical Industries, Ltd.) and then added to 5 mL of concentrated sulfuric acid (98% by mass, produced by Wako Pure Chemical Industries, Ltd.). The mixture is refluxed at 65° C. for 6 hours to attain methyl-esterification. The reaction scheme is shown in FIG. 8.

The temperature of the solution is lowered to room temperature, and a precipitate is separated by filtration. The precipitate is washed with water and then recovered. The precipitate thus recovered is measured for infrared absorption spectrum. Absorption peaks at 1,735 cm$^{-1}$ and from 1,000 to 1,300 cm$^{-1}$, which are characteristic of an ester, are observed in the spectrum, and thus it is confirmed that the carbon nanotube carboxylic acid is esterified.

[Mixing Step]

30 mg of the methyl-esterified carbon nanotube carboxylic acid obtained in the aforementioned step is added to 4 g of glycerin (produced by Kanto Kagaku Co., Ltd.) and mixed by using an ultrasonic dispersing machine. The mixture is then added to 4 g of methanol as a viscosity adjusting agent to prepare a crosslinking solution (1).

(A-2) Surface-treating Step of Substrate

A silicon wafer (diameter: 76.2 mm (3 inch), thickness: 380 μm, thickness of surface oxide film: 1 μm, produced by Advantec Co., Ltd.) as a substrate 112 (dielectric substrate 40) is prepared. In order to improve adsorbability between the silicon wafer and the crosslinking solution (1) to be coated thereon, the substrate is subjected to a surface treatment with aminopropyl triethoxysilane.

The surface treatment with aminopropyl triethoxysilane is carried out by exposing the substrate 112 to vapor of 50 μL of aminopropyl triethoxysilane (produced by Sigma-Aldrich Company) in a sealed dish.

(A-3) Applying (Coating) Step

The crosslinking solution (1 μL) prepared in the step (A-1) is coated on the surface of the substrate 112 having been subjected to the surface treatment by using a spin coater (1H-DX2, a trade name, produced by Mikasa Co., Ltd.) at 100 rpm for 30 seconds.

(B) Crosslinking Step

Figure 9:
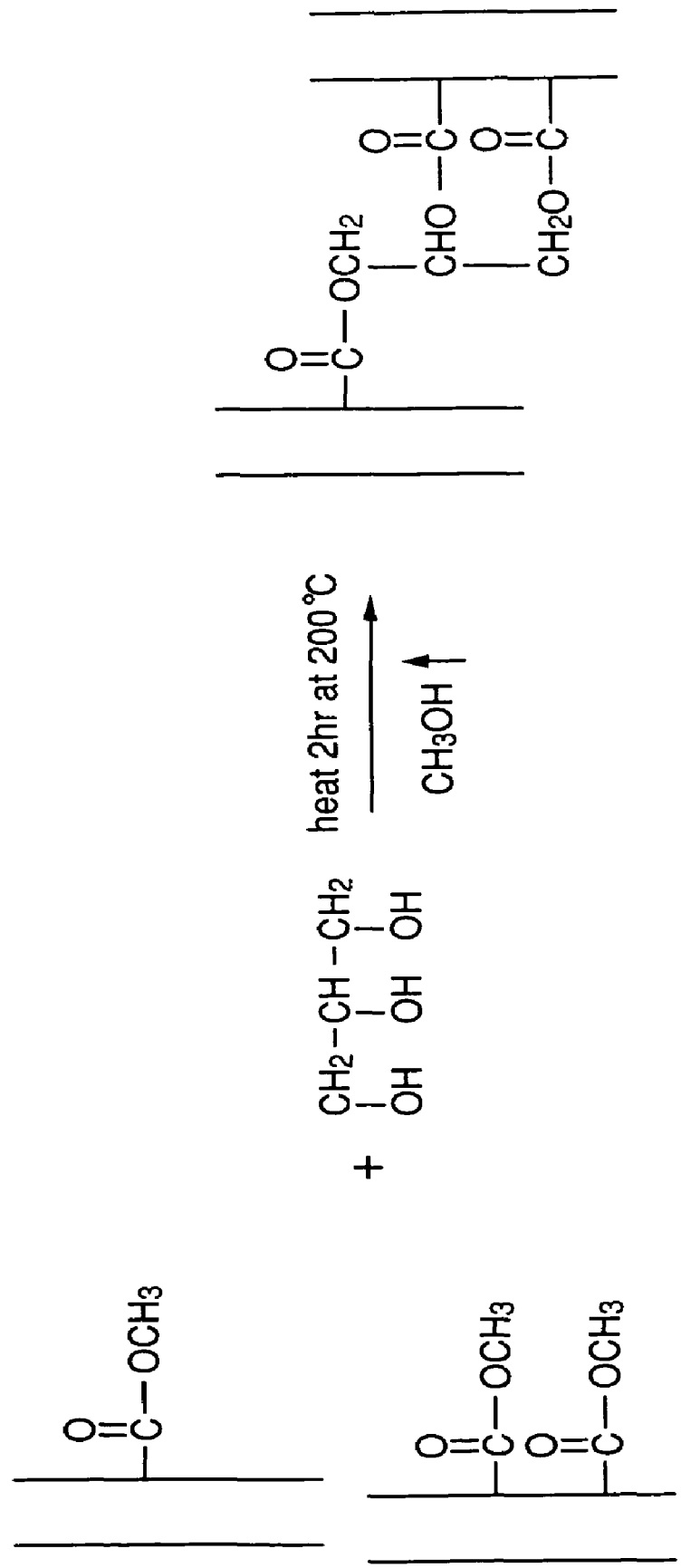
FIG. 9 is a reaction scheme showing a crosslinking reaction by an ester exchanging reaction in the crosslinking step in Example 1.

After coating the crosslinking solution, the substrate 112 (dielectric substrate 40) having the crosslinking film formed thereon is heated at 200° C. for 2 hours to cure the crosslinking film to form a carbon nanotube structure 114 (see FIG. 5A). For comparison, across linking film is similarly cured on a glass substrate having been subjected to no surface treatment. The reaction scheme is shown in FIG. 9.

Observation of the resulting carbon nanotube structure 114 with an optical microscope reveals that a significantly uniform cured film is obtained.

(C) Patterning Step (C-1) Resist Layer Forming Step

A resist material (NPR9710, a trade name, produced by Nagase & Co., Ltd., viscosity: 50 mPa·s) is coated on the surface of the carbon nanotube structure 114 formed on the substrate 112 (having been subjected to the surface treatment) by using a spin coater (1H-DX2, a trade name, produced by Mikasa Co., Ltd.) at 2,000 rpm for 20 seconds, and then a film is formed by heating on a hot plate at 100° C. for 2 minutes to form a resist layer 116 (see FIG. 5B).

The composition of the resist material, NPR9710, is as follows.

| | |
|---|---|
| Propylene glycol monomethylether acetate | 50 to 80% by mass |
| Novolak resin | 20 to 50% by mass |
| Photosensitive agent | less than 10% by mass |

The surface of the substrate 112 having the carbon nanotube structure 114 and the resist layer 116 formed thereon on the side where the resist layer 116 is formed is exposed by using a mask aligner (MA-20, a mercury lamp, produced by Mikasa Co., Ltd., wavelength: 436 nm) with a light intensity of 12.7 mW/cm$^2$ for 4 seconds to a shape of an antenna element 20 shown in FIG. 11.

The substrate 112 (dielectric substrate 40) thus exposed is heated on a hot plate at 110° C. for 1 minute, and after standing to cool, it is developed by using NMD-3, a trade name, produced by Tokyo Ohka Kogyo Co., Ltd. (tetramethylammonium hydroxide: 2.38% by mass) as a developer solution in a developing machine (AD-1200, a trade name, produced by Takizawa Sangyo Co., Ltd.). It is confirmed at this time that the resist layer 116 is formed to have the shape of the antenna element (the shape of the antenna element layer 20 in FIG. 11, i.e., the shape of the prescribed pattern) with an optical microscope.

(C-2) Removing Step

The substrate 112 having the resist layer 116 formed thereon to the prescribed pattern is heated to 200° C. in a mixed gas (oxygen: 10 mL/min, nitrogen: 40 mL/min) by using an UV asher (excimer vacuum ultraviolet ray lamp, EXM-2100BM, a trade name, produced by Atom Giken Co., Ltd., wavelength: 172 nm) and irradiated with an ultraviolet ray (wavelength: 172 nm) for 5 hours to generate oxygen radicals, whereby a part of the carbon nanotube structure 114 not protected by the resist layer 116 is removed. As a result, the carbon nanotube structure 114 covered with the resist layer 116 is formed into the shape of the antenna element layer 20 shown in FIG. 11 (see FIG. 5D). In this stage, the resist layer 116 remaining on the surface of the substrate 112 through the carbon nanotube structure 114.

(C-3) Resist Removing Step

The resist layer 116 remaining as an upper layer of the carbon nanotube structure 114 formed to have the prescribed patter is removed by washing out with acetone (see FIG. 5E), so as to obtain the antenna element layer 20 (square shape, 25×25 mm), which functions as an antenna element of a microwave antenna in this example.

(D) Other Constitution

A metallic wiring (power feeding electrode) 14 for feeding electric power is provided as being in contact with one edge of the antenna element layer 20 formed with the carbon nanotube structure functioning as an antenna element formed on the surface of the dielectric substrate 40 (substrate 112), so as to cover the same from the above. Specifically, a gold wiring having a width of 1 mm and a length of 8 mm is formed as the metallic wiring 14 by using a metal mask as shown in FIGS. 10 and 11.

Furthermore, as shown in FIG. 10, a metallic electrode (earth electrode) 12 as an earth surface is formed on the whole back surface of the dielectric substrate 40 (on the side where the antenna element layer 20 and the like are not provided) by vapor-depositing gold.

Subsequently, a coaxial core wire 16c is connected and fixed to the metallic wiring 14 with solder 22 through a via hole 24 having been formed, and a coaxial shielding wire 16a is connected and fixed to the metallic electrode 12 with solder 18. Accordingly, the coaxial wiring 16 is in a state where it is capable of being connected to an exterior.

A microwave antenna of this example is thus produced in the aforementioned manner.

[Evaluation Test]

Figure 12:
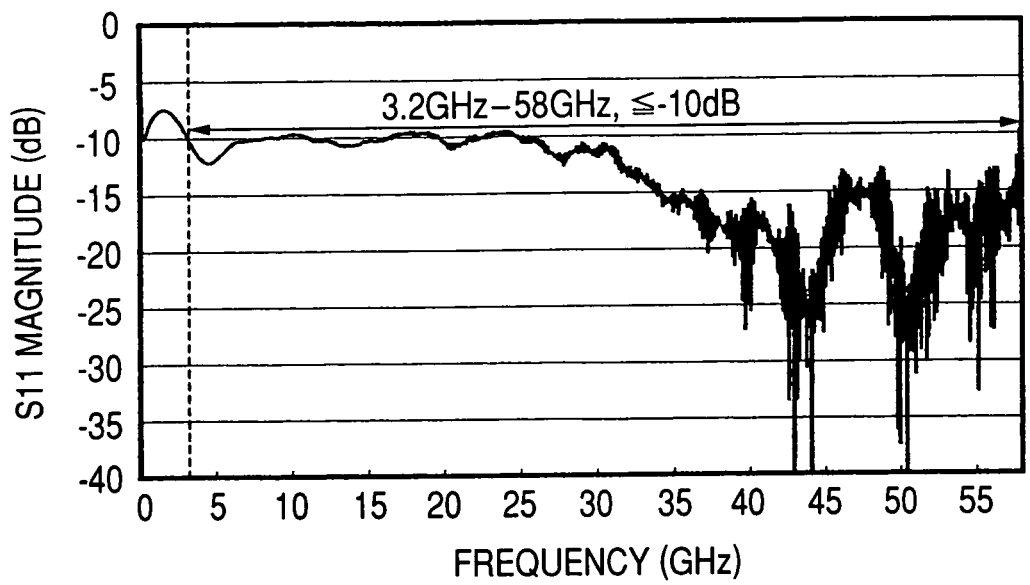
FIG. 12 is a graph showing return loss of the microwave antenna produced in Example 1.

The microwave antenna of this example thus obtained is evaluated for return loss (S11) by using a network analyzer 37397C (produced by Anritsu Corp.) and an adjunctive universal test fixture. The results are shown in FIG. 12. As shown in FIG. 12, a return loss of −10 dB or less is obtained in a wide range of frequency of from 3.2 to 58 GHz. It is thus confirmed that an antenna element of a wide bandwidth is realized by utilizing the carbon nanotube structure, and such a microwave antenna is obtained that has a small size and high sensitivity but can be used in a wide frequency range.

Example 2

Figure 13:
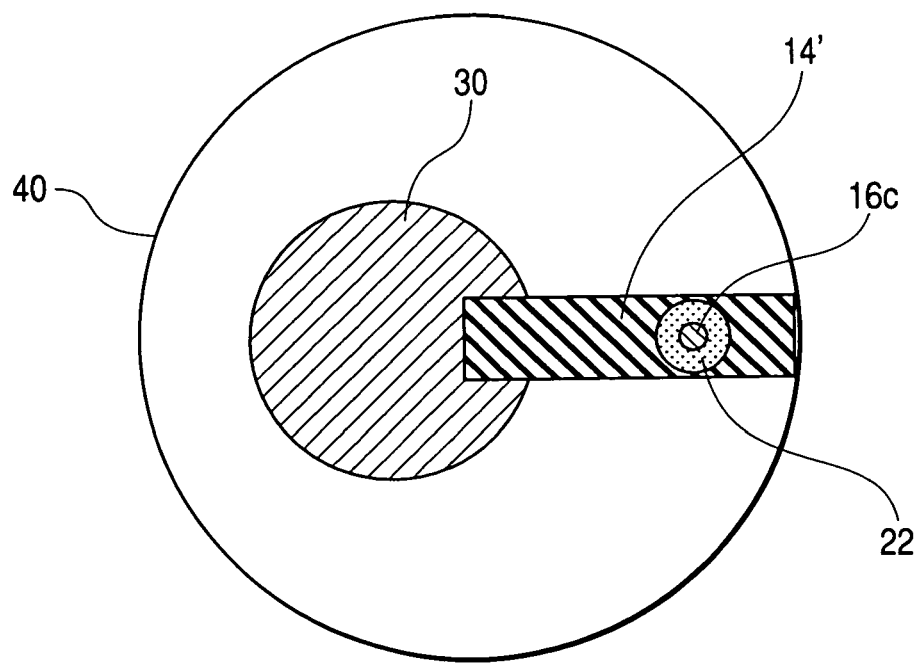
FIG. 13 is a plane view showing a microwave antenna produced in Example 2.

In Example 2, a microwave antenna having a constitution shown in FIG. 13 is produced according to the procedures in Example 1 by using the crosslinking solution obtained in the section (A-1) Preparation of Crosslinking Solution in Example 1. FIG. 13 is a plane view showing the microwave antenna to be produced in this example. The microwave antenna to be produced in this example is similar in cross sectional structure to that in Example 1, and therefore, FIG. 11 is used for the schematic cross sectional view of this example.

In this example, the patterning shape in the section (C) Patterning Step is differentiated. Specifically, the exposure by using a mask aligner (MA-20, a mercury lamp, produced by Mikasa Co., Ltd., wavelength: 436 nm) in the section (C-1) Resist Layer Forming Step is carried out to the shape of the antenna element layer 30 shown in FIG. 13 (circular form with diameter of 4 mm), and the antenna element layer 30 having that shape is formed. In this example, furthermore, the shape of the metallic wiring (power feeding electrode) 14' for feeding electric power is a width of 1 mm and a length of 4 mm.

A microwave antenna according to this example is produced in the same manner as in Example 1 except for the aforementioned constitutions.

[Evaluation Test]

Figure 14:
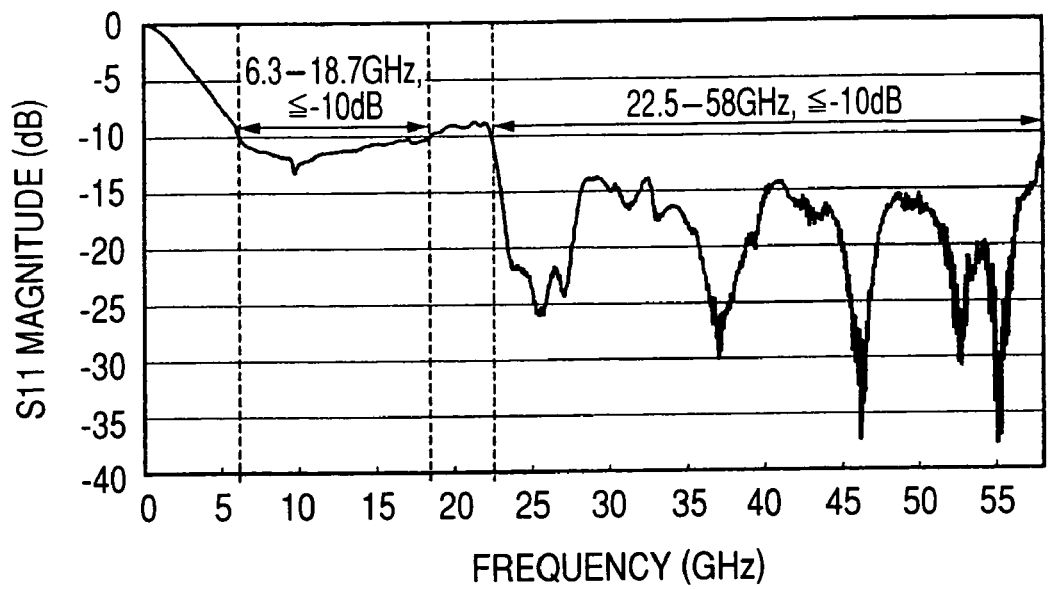
FIG. 14 is a graph showing return loss of the microwave antenna produced in Example 2.

The microwave antenna of this example thus obtained is evaluated for return loss (S11) by using the same network analyzer as in Example 1. The results are shown in FIG. 14. As shown in FIG. 14, a return loss of −10 dB or less is obtained in two ranges of frequency of from 6.3 to 18.7 GHz and from 22.5 to 58 GHz. It is thus confirmed that an antenna element of a wide bandwidth is realized by utilizing the carbon nanotube structure, and such a microwave antenna is obtained that has a small size and high sensitivity but can be used in a wide frequency range, while the sensitivity in a low frequency range is slightly narrowed in comparison to Example 1.

Example 3

Figure 15:
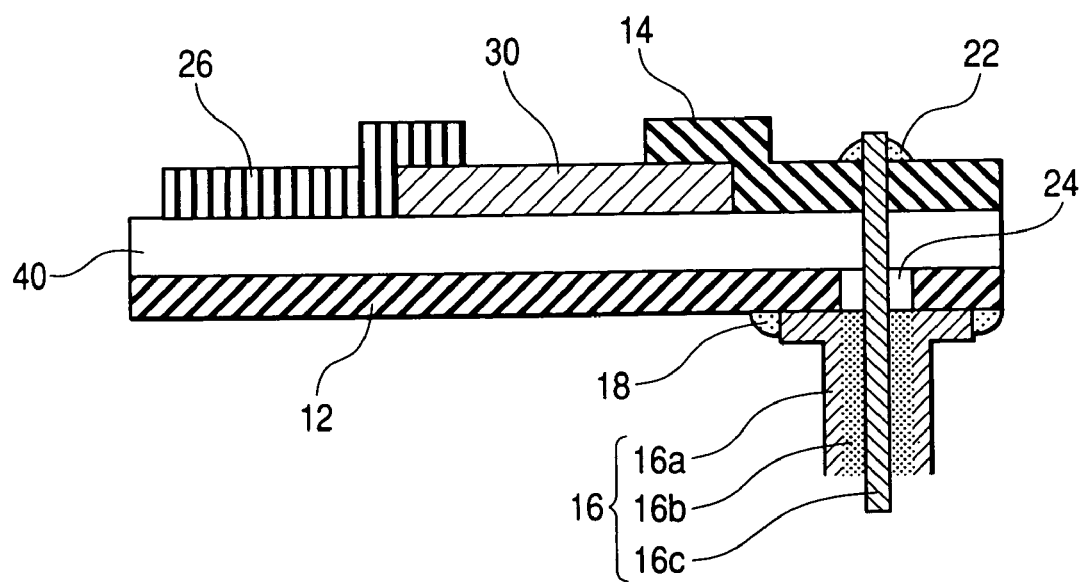
FIG. 15 is a schematic cross sectional view showing a microwave antenna produced in Example 3.
Figure 16:
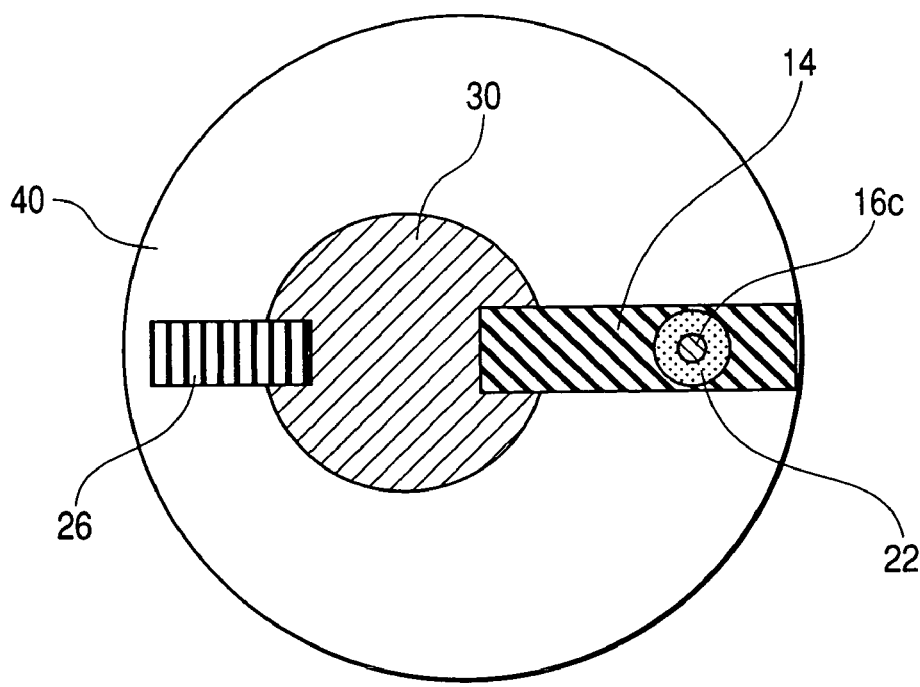
FIG. 16 is a plane view showing the microwave antenna in FIG. 15 viewed from the above.

In Example 3, a microwave antenna having a constitution shown in FIGS. 15 and 16 is produced according to the procedures in Example 2 by forming a metallic patter as a second conductor. FIG. 15 is a schematic cross sectional view showing the microwave antenna to be produced in this example, and FIG. 16 is a plane view thereof viewed from the above in FIG. 15.

The operations are carried out in the same manner as in Example 2 until the step of the section (C-3) Resist Layer Removing Step in Example 1, so as to obtain a dielectric substrate 40 (substrate 112) having formed thereon an antenna element layer 30 (circular form with diameter of 4 mm) functioning as an antenna element of the microwave antenna of this example.

A metallic wiring (power feeding electrode) 14 for feeding electric power is provided as being in contact with a part of the antenna element layer 30 formed with the carbon nanotube structure functioning as an antenna element formed on the surface of the dielectric substrate 40 (substrate 112), so as to cover the same from the above. Specifically, a gold wiring having a width of 1 mm and a length of 10 mm is formed as the metallic wiring 14 by using a metal mask as shown in FIG. 14.

A gold pattern having a width of 1 mm and a length of 10 mm is formed at a position as being opposed to the metallic wiring 14 with the antenna element layer 30 intervening therebetween, so as to form a metallic pattern (second conductor) 26. The metallic wiring 14 and the metallic pattern 26 are disposed coaxially.

A metallic electrode (earth electrode) 12 and a coaxial wiring 16 are disposed in the same manner as in Examples 1 and 2, so as to produce a microwave antenna of this example.

[Evaluation Test]

Figure 17:
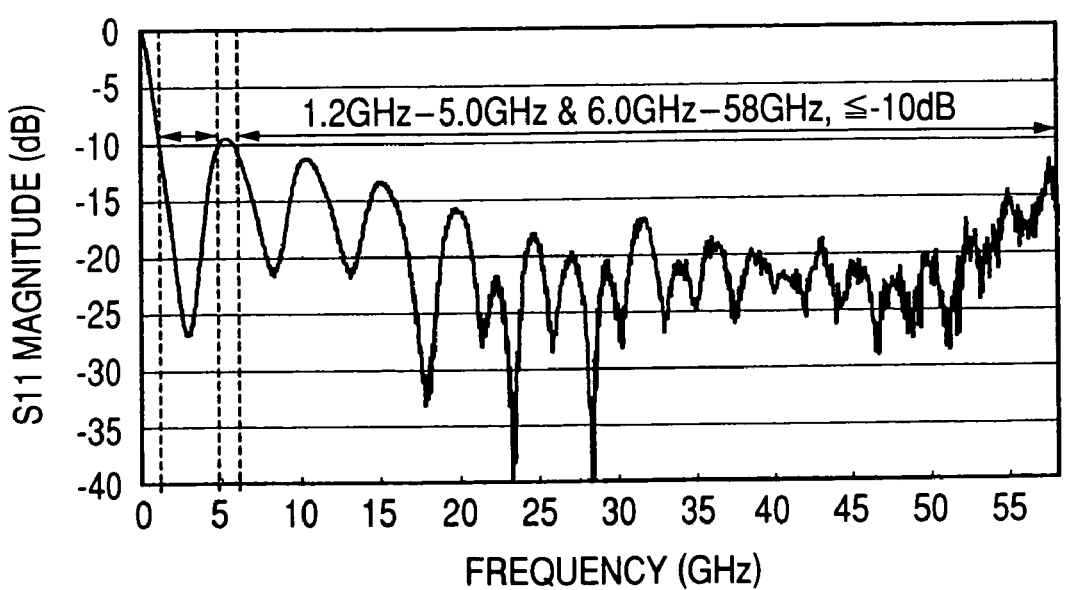
FIG. 17 is a graph showing return loss of the microwave antenna produced in Example 3.

Evaluation for return loss (S11) is carried out by using the same network analyzer as in Example 1. The results are shown in FIG. 17. As shown in FIG. 17, a return loss of −10 dB or less is obtained in two ranges of frequency of from 1.2 to 5.0 GHz and from 6.0 to 58 GHz.

Furthermore, a return loss of −15 dB or less is obtained in ranges of frequency of from 1.6 to 4.1 GHz, from 7.0 to 9.3 GHz, from 11.8 to 14.5 GHz, and from 16 to 58 GHz. Accordingly, the combination of the antenna element layer 30 formed with the carbon nanotube structure and the metallic patter (second conductor) 26 can further improve the frequency range and the radiation efficiency.

What is claimed is:

1. A microwave antenna comprising:
   a substrate;
   an antenna element which is supported on a surface of the substrate and includes a carbon nanotube structure constituting a network structure having a plurality of carbon nanotubes electrically connected to each other; and
   a power feeding electrode connected to the antenna element.

2. The microwave antenna according to claim 1, wherein the substrate is in a plate form.

3. The microwave antenna according to claim 1, wherein the power feeding electrode is a metallic electrode.

4. The microwave antenna according to claim 1, wherein at least a whole area of the surface of the substrate, on which the antenna element is supported, is electrically insulative.

5. The microwave antenna according to claim 1, further comprising an earth electrode on a position of the substrate.

6. The microwave antenna according to claim 5, wherein the earth electrode is a metallic electrode.

7. The microwave antenna according to claim 5, wherein the earth electrode is disposed on a surface of the substrate different from the surface on which the antenna element is supported.

8. The microwave antenna according to claim 5, wherein the earth electrode is provided on an area on a surface of the substrate on which the antenna element is supported, and provided in an area different from an area in which the antenna element is supported.

9. The microwave antenna according to claim 5, wherein the earth electrode is provided inside the substrate.

10. The microwave antenna according to claim 1, further comprising a conductor electrically connected to the antenna element.

11. The microwave antenna according to claim 10, wherein the conductor is a metallic electrode.

12. The microwave antenna according to 1, wherein the carbon nanotube structure comprises a plurality of carbon nanotubes and a crosslinked part including a chemical bond of a plurality of functional groups, the chemical bond at least connecting one end of one of the carbon nanotubes to another one of the carbon nanotubes.

13. The microwave antenna according to claim 12, wherein the crosslinked part is formed by curing a carbon nanotube having a functional group and a crosslinking agent capable of reacting with the functional group, to cause a crosslinking reaction of the functional group contained in the carbon nanotube with the crosslinking agent.

14. The microwave antenna according to claim 13, wherein the crosslinked part has a chemical structure selected from the group consisting of —COO(CH$_2$)$_2$OCO—, —COOCH$_2$CHOHCH$_2$OCO—, —COOCH$_2$CH(OCO—)CH$_2$OH and —COOCH$_2$CH(OCO—)CH$_2$OCO—.

15. The microwave antenna according to claim 12, wherein the crosslinked part has a structure formed with a chemical bond of the plurality of the functional groups.

16. The microwave antenna according to claim 15, wherein the crosslinked part has at least one chemical structure selected from the group consisting of —COOCO—, —O—, —NHCO—, —COO—, —NCH—, —NH—, —S—, —O—, —NHCOO— and —S—S—.

17. A process for producing a microwave antenna including a substrate; an antenna element which is supported on a surface of the substrate and includes a carbon nanotube structure constituting a network structure having a plurality of carbon nanotubes electrically connected to each other; and a power feeding electrode connected to the antenna element, the process comprising:
   applying a plurality of carbon nanotubes each having a functional group to a surface of the substrate; and crosslinking the functional groups with a chemical bond to form a crosslinked part, so as to form the carbon nanotube structure.

18. The process according to claim 17, further comprising, patterning the carbon nanotube structure to a desired shape subsequently to the crosslinking.

19. The process according to claim 18, wherein the patterning comprises:
applying dry etching to the carbon nanotube structure on the surface of the substrate in an area other than a pattern corresponding to the desired shape to remove the carbon nanotube structure in the area, so as to pattern the carbon nanotube structure to a pattern corresponding to the antenna element.

20. The process according to claim 18, wherein the patterning comprises:
forming a resist layer on the carbon nanotube structure on the surface of the substrate in an area having a pattern corresponding to the desired shape; and
removing the carbon nanotube structure exposed in an area other than the area having the resist layer formed thereon by applying dry etching to a surface having the carbon nanotube structure and the resist layer accumulated on the substrate.

21. The process according to claim 20, wherein the removing comprises irradiating the surface having the carbon nanotube structure and the resist layer accumulated on the substrate with a radical of an oxygen molecule.

22. The process according to claim 21, wherein the irradiating comprises:
irradiating an oxygen molecule with an ultraviolet ray to generate an oxygen radical; and
irradiating the surface having the carbon nanotube structure and the resist layer accumulated on the substrate with the oxygen radical.

23. The process according to claim 20, wherein the patterning further comprises removing the resist layer subsequently to the removing.

24. The process according to claim 20, wherein the resist layer is a resin layer.

25. The process according to claim 18, wherein the patterning comprises:
selectively irradiating the carbon nanotube structure on the surface of the substrate in an area other than a pattern corresponding to the desired shape with an ion beam of an ion of a gas molecule to remove the carbon nanotube structure in the area, so as to pattern the carbon nanotube structure to a pattern corresponding to the antenna element.

26. The process according to claim 17, wherein, the applying further comprises applying a crosslinking agent that crosslinks the functional groups to the surface of the substrate.

27. The process according to claim 26, wherein the crosslinking agent is a non-self-polymerizable crosslinking agent.

28. The process according to claim 27, wherein the functional group is at least one selected from the group consisting of —OH, —COOH, —COOR, —COX, —NH$_2$ and —NCO, and the crosslinking agent is a crosslinking agent capable of undergoing a crosslinking reaction with the functional group selected,
wherein
R represents a substituted or unsubstituted hydrocarbon group; and
X represents a halogen atom.

29. The process according to claim 27, wherein the crosslinking agent is at least one crosslinking agent selected from the group consisting of a polyol, a polyamine, a polycarboxylic acid, a polycarboxylate ester, a polycarboxylic acid halide, a polycarbodiimide and a polyisocyanate, and the functional group is a functional group capable of undergoing a crosslinking reaction with the crosslinking agent selected.

30. The process according to claim 27, wherein
the functional group is at least one selected from the group consisting of —OH, —COOH, —COOR, —COX, —NH$_2$ and —NCO,
the crosslinking agent is at least one crosslinking agent selected from the group consisting of a polyol, a polyamine, a polycarboxylic acid, a polycarboxylate ester, a polycarboxylic acid halide, a polycarbodiimide and a polyisocyanate, and
the functional group and the crosslinking agent are selected to make a combination capable of undergoing a crosslinking reaction with each other,
wherein
R represents a substituted or unsubstituted hydrocarbon group; and
X represents a halogen atom.

31. The process according to claim 26, wherein the functional group is —COOR,
wherein R represents a substituted or unsubstituted hydrocarbon group.

32. The process according to claim 31, wherein the crosslinking agent is a polyol.

33. The process according to claim 32, wherein the crosslinking agent is at least one selected from the group consisting of glycerin, ethylene glycol, butenediol, hexynediol, hydroquinone and naphthalenediol.

34. The process according to claim 26, wherein, the applying further comprises applying a solution containing the plurality of carbon nanotubes each having a functional group, the crosslinking agent and a solvent to the surface of the substrate.

35. The process according to claim 26, wherein the crosslinking agent functions as a solvent.

36. The process according to claim 17, wherein a reaction forming the chemical bond is a reaction chemically bonding the plurality of functional groups.

37. The process according to claim 36, wherein the applying further comprises applying an additive causing the chemical bond of the plurality of functional groups to the surface of the substrate.

38. The process according to claim 37, wherein the reaction is a dehydration condensation reaction, and the additive is a condensing agent.

39. The process according to claim 38, wherein the condensing agent is at least one selected from the group consisting of sulfuric acid, N-ethyl-N'-(3-methylaminopropyl)carbodiimide and dicyclohexylcabodiimide.

40. The process according to claim 38, wherein the functional group is at least one selected from the group consisting of —COOR, —COOH, —COX, —OH, —CHO and —NH$_2$,
wherein
R represents a substituted or unsubstituted hydrocarbon group; and
X represents a halogen atom.

41. The process according to claim 38, wherein the functional group is —COOH.

42. The process according to claim 37, wherein the reaction is a substitution reaction, and the additive is a base.

43. The process according to claim 42, wherein the base is at least one selected from the group consisting of sodium hydroxide, potassium hydroxide, pyridine and sodium ethoxide.

44. The process according to claim 42, wherein the functional group is at least one selected from the group consisting of —$NH_2$, —X, —SH, —OH, —$OSO_2CH_3$ and —$OSO_2(C_6H_4)CH_3$, wherein X represents a halogenatom.

45. The process according to claim 36, wherein the reaction is an addition reaction.

46. The process according to claim 45, wherein the functional group is at least one of —OH and —NCO.

47. The process according to claim 37, wherein the reaction is an oxidation reaction.

48. The process according to claim 47, wherein the functional group is —SH.

49. The process according to claim 47, wherein the additive is an oxidation reaction accelerator.

50. The process according to claim 49, wherein the oxidation reaction accelerator is iodine.

51. The process according to claim 36, wherein, the applying further comprises applying a solution containing the plurality of carbon nanotubes each having a functional group and a solvent to the surface of the substrate.

52. The process according to claim 37, wherein, the applying further comprises applying a solution containing the plurality of carbon nanotubes each having a functional group, the additive and a solvent to the surface of the substrate.

* * * * *